United States Patent
Tanaka et al.

[11] Patent Number: 5,695,002
[45] Date of Patent: Dec. 9, 1997

[54] HIGH-CYCLE REGENERATIVE HEAT EXCHANGER

[75] Inventors: Ryoichi Tanaka, Tokyo; Mamoru Matsuo, Zama, both of Japan

[73] Assignee: Nippon Furnace Kogyo Kaisha, Ltd., Yokohama, Japan

[21] Appl. No.: 548,694

[22] Filed: Oct. 26, 1995

Related U.S. Application Data

[63] Continuation of Ser. No. 182,829, Jan. 19, 1994, abandoned.

[30] Foreign Application Priority Data

Jan. 19, 1993 [JP] Japan ................... 5-006911

[51] Int. Cl.$^6$ ............................................. F28D 19/00
[52] U.S. Cl. .................................... 165/10; 165/4
[58] Field of Search ............................ 165/4, 6, 8, 9, 165/9.1, 9.4, 10

[56] References Cited

U.S. PATENT DOCUMENTS

| | | | |
|---|---|---|---|
| 3,207,493 | 9/1965 | Swain | 165/4 |
| 3,375,867 | 4/1968 | Daunt | |
| 3,712,597 | 1/1973 | Waitkus et al. | 263/15 R |
| 4,299,561 | 11/1981 | Stokes | 165/4 |
| 4,337,585 | 7/1982 | Hebrank | 165/4 |
| 4,627,485 | 12/1986 | Osborn | 165/9.1 |

FOREIGN PATENT DOCUMENTS

| | | |
|---|---|---|
| 0111382 | 6/1984 | European Pat. Off. |
| 3414035 | 10/1985 | Germany |
| 2-415583 | 9/1992 | Japan |
| 4251190 | 9/1992 | Japan |
| 2170586 | 8/1986 | United Kingdom |

OTHER PUBLICATIONS

Nippon Furnace Kogyo Kaaisha, Ltd., Masao Kawamoato and Hirokuni Kikukawa "High–Cycle Regenerative Combustion System", JFRC 1990 (Dec., 1990).

Nippon Furance Kogyo Kaisha, Ltd., Mamoru Matsuo "High–Cycle Regenerative Combustion System," 149 JIT-SUMU Tenbo (Sep. 1992).

Patent Abstracts of Japan, vol. 17, No. 27 (M–1355) (Jan. 1993).

Primary Examiner—John Rivell
Assistant Examiner—Christopher Atkinson
Attorney, Agent, or Firm—Reid & Priest L.L.P.

[57] ABSTRACT

A high-cycle regenerative combustion system has first and second regenerative heat exchanger units. A four-way valve is provided for alternately bringing the heat exchanger units into contact with a low temperature fluid and a high temperature fluid. The valve is switched at a switching cycle time not longer than 60 seconds. Each heat exchanger unit has a void ratio ε which substantially provides the maximum value (Q/V)max of the volumetric efficiency (Q/V). The temperature efficiency η t is preset to be a value in a range between 0.7 and 1.0. The heat transmission coefficient h and the heat transmission area A of the heat exchanger unit are determined such that the temperature efficiency, which is calculated in accordance with a specific equation as being a function of the heat transmission coefficient, the heat transmission area and the switching cycle time τ, falls under the preset value within the range mentioned above. Each of the first and second heat exchanger units has the cell pitch P and the cell wall thickness b, which provide the above-mentioned values of the void ratio, heat transmission coefficient and heat transmission area. Thus, a compact and high-performance regenerative heat exchanger can be obtained, which has a reduced overall volume while exhibiting the large heat transmission rate and high temperature efficiency.

29 Claims, 22 Drawing Sheets

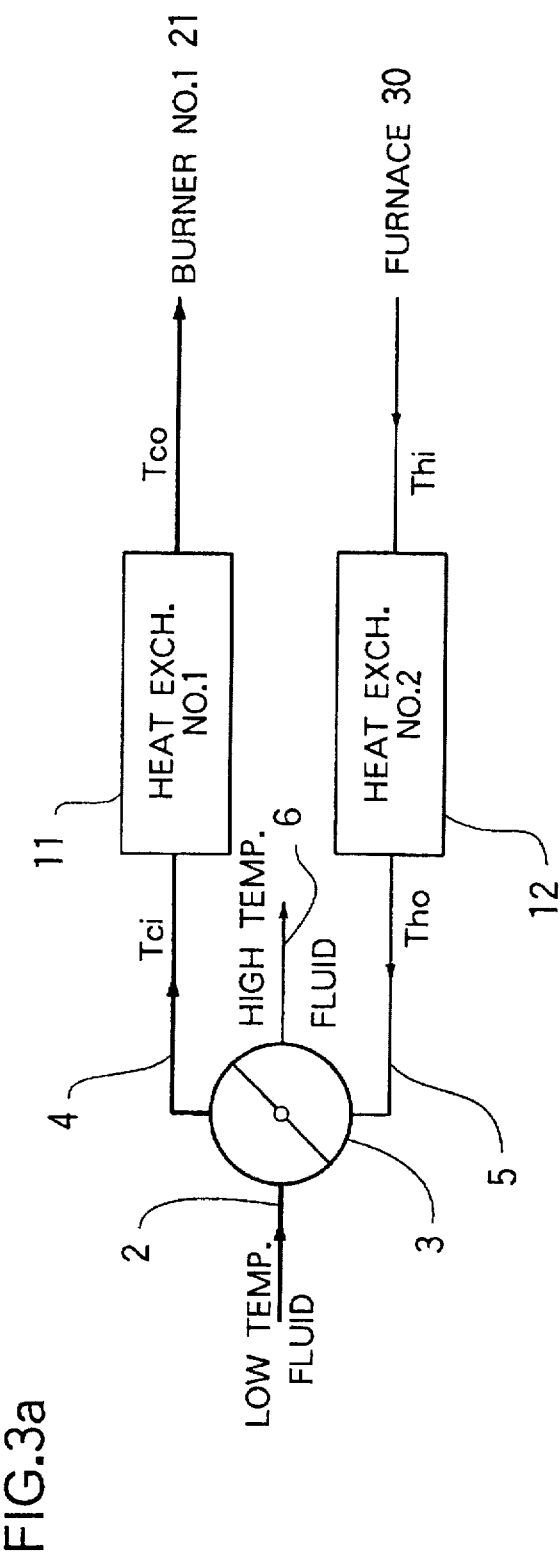
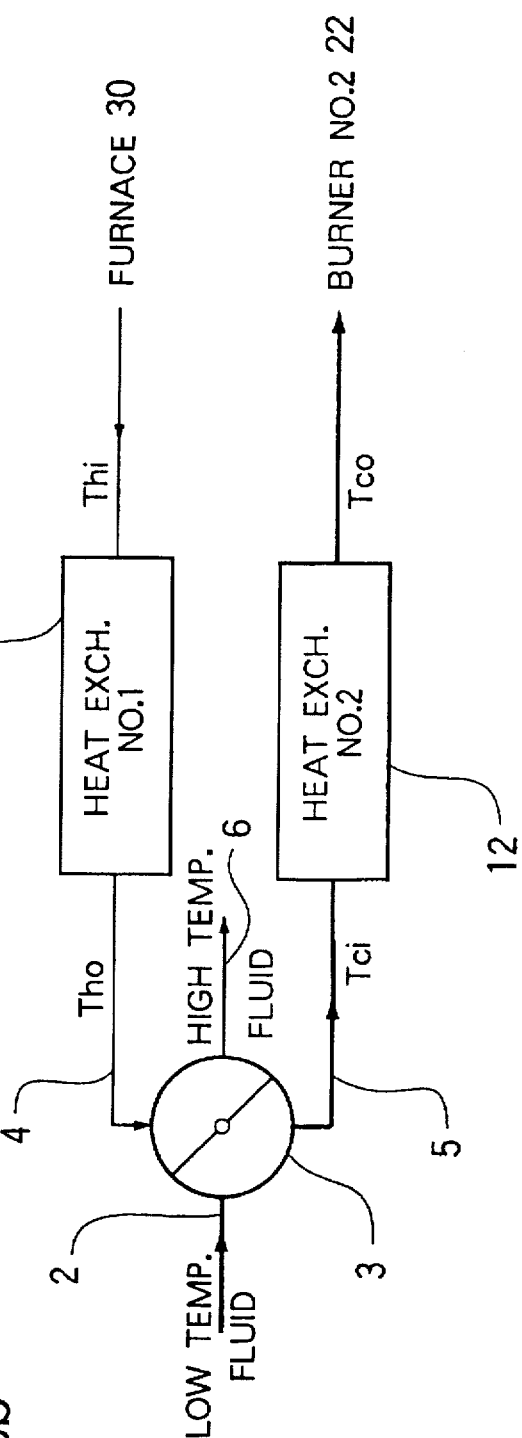
FIG.3a
FIG.3b

HIGH-CYCLE REGENERATIVE HEAT EXCHANGER

This is a continuation of U.S. patent application Ser. No. 08/182,829, filed Jan. 19, 1994 now abandoned.

BACKGROUND OF THE INVENTION

The present invention relates to a regenerative heat exchanger and, more particularly, to a regenerative heat exchanger for use in a high-cycle regenerative combustion system having a switching cycle time set to be 60 seconds or shorter, the heat exchanger alternately contacting a low temperature fluid which is combustion air, fuel gas or a mixture of the combustion air and the fuel gas, and a high temperature fluid which is exhaust gas, flue gas or burnt gas generated as a result of combustion in the combustion system, so as to perform heat exchange between the low temperature fluid and the high temperature fluid.

A regenerative combustion system has been known that has a combustor and a heat recovery heat exchanger or a recuperator. Such a heat exchanger is brought into contact with a low temperature fluid which is combustion air, fuel gas or a mixture of the combustion air and the fuel gas, and a high temperature fluid which is exhaust gas generated through the combustion. The heat energy possessed by the high temperature fluid is accumulated in the heat exchanger and transferred the low temperature fluid. This type of heat exchangers can be practically used in a variety of plants or industrial furnaces such as, for example, a hot air oven for a blast furnace, a coke oven, and a glass melting furnace.

Such a combustion system may have, for example, a pair of burners which constitute a combustor, and a first regenerative heat exchanger and a second regenerative heat exchanger which are disposed in the respective combustion air introduction passages leading to the respective burners. The burners are switched to operate alternately and periodically at a predetermined cycle time such that, when the first burner operates to burn a fuel, the exhaust gas generated as a result of the burning is discharged through the other combustion air introduction passage associated with the second burner. Consequently, the heat energy of the hot exhaust gas is accumulated and conserved in the second heat exchanger as a result of exchange of heat between the exhaust gas and the second heat exchanger. The combustor is then switched so that the second burner is put into operation. During the operation of the second burner, combustion air is supplied through the second heat exchanger which has been already heated so as to be pre-heated before reaching the second burner.

In the known switching heat-regenerative combustion system, the cycle time at which the burners are switched is set to be a very long time, which impracticably lowers and degrades a temperature efficiency and a heat recovery efficiency. Further, the whole apparatus including the heat exchangers has to have a large scale in order to realize a great heat accumulation capacity. Under this circumstance, a system generally referred to as high-cycle, regenerative combustion system (HRS) or high-speed switching regenerative combustion system has been proposed in recent years, which system is intended to have an improved temperature efficiency, as well as a reduced size, so as to eliminate the above-described drawback of the conventional system.

Meanwhile, the present applicant already has proposed, in the specification of Japanese Patent Application No. 2-415583 (Laid-Open No. 4-251190), a honey-comb type ceramic heat accumulator which serves as a heat-regenerative heat exchanger for use in a high-cycle regenerative combustion system of the kind as mentioned above.

The honeycomb type heat accumulator discussed in the above-mentioned specification has been constructed to meet the following three major design requirements:

(i) To set the net or substantial volume Vc per the apparent or gross volume V of the heat accumulator to be a large value, in order to enhance the heat accumulation capacity.

(ii) To set the heat transmission area At per the apparent volume V of the heat accumulator to a large value, in order to enhance the heat transmission rate.

(iii) To set the pressure loss $\Delta P$ of the fluid to be a small value.

In addition, the pitch or span of the cell walls and the thickness of the cell wall, i.e., the honeycomb pitch and the honeycomb wall thickness of the heat exchanger, are determined such that the multiplication product of the above-mentioned three factors, i.e., (Vc/V) by (At/V) by (1/$\Delta$P), substantially exhibits a maximum value. At the same time, the ratio P/b between the honeycomb pitch P and the honeycomb wall thickness b is preferably determined so as to range from 5 to 10, more preferably to be 7.5.

However, the above-mentioned specification merely relates to the relative sizes of various portions of the heat accumulator falling within desired ranges and therefore, it fails to provide any measure or approach which would enable reduction in the bulk size or overall volume of the heat accumulator. The present inventors found that the performance of a heat exchanger is generally evaluated in terms of a heat transmission rate and a temperature efficiency, and that the overall volume of the heat accumulator therefore has to be essentially increased in order that the heat transmission rate is enhanced while achieving a high temperature efficiency of 0.7 to 1.0 which is necessary for a high-cycle regenerative combustion system. It follows that the heat exchanger having the above-described honeycomb heat accumulator inevitably suffers from a problem in that the bulk size or the overall volume of the heat exchanger is impracticably increased in order to achieve the required heat exchanging performance. This leads to a conclusion that such a honeycomb heat accumulator as conventionally proposed cannot preferably be used as the regenerative heat exchanger which has to be disposed in a limited space available in a high-cycle regenerative combustion system.

Thus, the honeycomb structure disclosed in the above-mentioned specification has been designed without any specific consideration of the switching cycle time of the burners. The above-described design conditions of honeycomb heat accumulator, therefore, are not desirably adoptable in designing a switching heat-regenerative heat exchanger suitable for use in a high-cycle switching combustion system in which the switching cycle time is set to be a relatively short period of 60 seconds or shorter.

SUMMARY OF THE INVENTION

An object of the present invention is to provide a regenerative heat exchanger which is suitable for use in a high-cycle regenerative combustion system having a switching cycle time of 60 seconds or shorter and which has a reduced overall volume while ensuring a high heat transmission rate and a temperature efficiency, thereby realizing a regenerative heat exchanger which is compact in construction and which is superior in performance.

The present inventors found the fact that both the improvement in the performance and reduction in the size of a heat exchanger can be simultaneously attained by enhancing a volumetric efficiency of the heat accumulator, which efficiency is defined in terms of the heat transmission rate of the heat accumulator per overall volume thereof, and found that the above-mentioned object of the present invention can be achieved by providing a heat exchanger having the following features.

According to one aspect of the present invention, there is provided a regenerative heat exchanger for use in a high-cycle regenerative combustion system having a switching cycle time set to be 60 seconds at the longest, the heat exchanger alternately contacting a low temperature fluid which is combustion air, fuel gas or a mixture of the combustion air and the fuel gas, and a high temperature fluid which is exhaust gas, flue gas or burnt gas generated as a result of combustion in the combustion system, so as to perform heat exchange between the low temperature fluid and the high temperature fluid, the regenerative heat exchanger comprising a heat accumulator having a honey-comb structure, wherein a volumetric efficiency of the heat accumulator, defined as a heat transmission rate of the heat accumulator per a whole volume of the heat accumulator, is set to be a function of a temperature efficiency, a fluid temperature and a void ratio, the temperature efficiency and the fluid temperature being determined to be a predetermined set value, the temperature efficiency being selected to be a value within a range of from 0.7 to 1.0 and set to be a function of a heat transmission coefficient of the heat accumulator, a heat transmission area thereof and the switching cycle time, wherein the heat accumulator has the void ratio at which the volumetric efficiency substantially exhibits a maximum value and also has the heat transmission coefficient and the heat transmission area which correspond to the predetermined value of the temperature coefficiency, and wherein the heat accumulator has a honey-comb pitch and a honey-comb wall thickness corresponding to the values of said heat transmission coefficient, heat transmission area and void ratio.

According to the features of the invention stated above, the honeycomb pitch and the honeycomb wall thickness substantially correspond to the maximum value of the volumetric efficiency. The volumetric efficiency has a small value when the overall volume of the heat accumulator is excessively large or when the heat transmission rate of the heat accumulator is excessively small, and therefore, the maximum value of the volumetric efficiency can be used as a parameter or index for most efficiently determining both the heat transmission rate and the overall volume of the heat accumulator. Thus, the heat accumulator exhibits the optimum heat transmission rate and has the minimal overall volume with respect to the great heat transmission rate, when it is designed to have the honeycomb pitch and the honeycomb wall thickness which substantially correspond to the maximum value of the volumetric efficiency.

Furthermore, these honeycomb pitch and honeycomb wall thickness provide the heat transmission coefficient and the heat transmission area which can realize the temperature efficiency ranging from 0.7 to 1.0. Therefore, the heat exchanger in accordance with the present invention can provide the high temperature efficiency ranging between 0.7 and 1.0 which is to be a target in a heat exchanger as used in a high-cycle switching regenerative combustion system.

In a preferred embodiment of the present invention, the volumetric efficiency (Q/V) is defined by the following equation (1), and the temperature efficiency ($\eta t$) is defined by the following equation (2):

$$Q/V = \eta t (Thi - Tci)(1-\epsilon)Cm/\tau \cdot PM2/PM1 \quad (1)$$

$$\eta t = 1/(1 + 2/PM1 + \exp(-2PM1/PM2)) \quad (2)$$

wherein PM1 and PM2 in the equations (1) and (2) are defined as follows:

$$PM1 = hA/Cg \, Gg$$

$$PM2 = hA\tau/Cm \, Gm$$

where the respective symbols represent the following factors:

| | |
|---|---|
| Tci: inlet temperature of the low temperature fluid | °C. |
| Thi: inlet temperature of the high temperature fluid | °C. |
| $\epsilon$: void ratio of the heat accumulator | |
| A: heat transmission area | m² |
| h: heat transmission coefficient | Kcal/m² °C. |
| $\tau$: switching cycle time | hr |
| Cg: constant-pressure specific heat of gas | Kcal/m³ N °C. |
| Gg: flow rate of the fluid | m³ N/h |
| Cm: specific heat of the heat accumulator | Kcal/m³ °C. |
| Gm: net volume of the heat accumulator | m³ | and wherein the heat accumulator has the void ratio ($\epsilon$) at which the volumetric efficiency (Q/V) exhibits the maximum value and also has the heat transmission coefficient (h) and the heat transmission area (A) with which the temperature efficiency ($\eta t$) exhibits the pre-set value, and the honey-comb pitch and the honey-comb wall thickness are determined to be values which correspond to said void ratio ($\epsilon$), heat transmission coefficient (h) and heat transmission area (A).

The above net volume (Gm), heat transmission area (A) and flow rate (Gg) are those of the whole heat exchanger (not partial values of a part thereof).

Preferably, the heat transmission coefficient (h) is calculated in accordance with the following equation (3):

$$h = 3.5T^{0.23}Vn^{0.8}/d^{0.2} \quad (3)$$

wherein the respective symbols represent the following factors:

d: equivalent diameter(m)
  equivalent diameter =
  4 × (cross-sectional area of flow passage)/
  (circumferential length of cross-section of flow passage T: mean temperature of fluid(K)
  T = 273 + (Thi+Tci)/2

Vn: fluid flow velocity (mN/s) converted to values under standard state (0° C. 1 atm)

More preferably, the pressure loss ($\Delta P/L$) across the flow passage per unit length of the passage is set to fall within the range of between 1000 and 2000 mm H$_2$O/m, preferably 1500 mm H$_2$O/m, and the flow velocity of the fluid is calculated in accordance with the following equation (4):

$$Vn = \sqrt{(d/1.3 \cdot 2g/\gamma n \cdot 273/T \cdot \Delta P/L)} \quad (4)$$

wherein the respective symbols represent the following factors:

g: gravitational acceleration(9.8 m/s)
L: length of fluid flow passage(m)
$\gamma n$: specific gravity of the fluid (Kg/m³N) in standard state (0° C., 1 atm)
$\Delta p$: pressure loss mmH$_2$O The equation (2) for determining the temperature efficiency ($\eta t$) has been created by the present inventors and is suitable for use in calculating the temperature efficiency, and the equations (3) and (4) for determining the heat transmission coefficient (h) and the flow velocity (Vn) are specific equations found by the inventors through experiments.

In a specific embodiment of the present invention, the heat accumulator is made of ceramics and the specific heat of the aforementioned heat accumulator is set to be 406. The use of ceramics as the material of the heat accumulator, however, is not exclusive and other materials such as coordierite, mullite, silicon carbide or silicon nitride may be used as the material to form the heat accumulator. The heat accumulator also may be formed by arranging in multiple or single layer formation or by spirally winding a porous sheet-type ceramics made of alumina fibers, which are produced and is available from Mitsui Kozan Kabushiki kaisha (Mitsui Mining Company, Limited) in a commercial name of ALMAX TAPE, SLEEVE(High Purity Continuous Alumina Fiber).

In still another embodied form of the present invention, the heat accumulator is made of steel and the specific heat (Cm) of the heat accumulator is set to be approximately 860. The heat accumulator also may be formed from the other metallic materials such as stainless steel, titanium, copper or other alloy.

According to a further aspect of the present invention, the heat accumulator has a lattice-like honey-comb structure having a plurality of flow passages each having a square or rectangular cross-section. For instance, the flow passage has a square cross-section defined by cell walls so as to have a honeycomb wall thickness b and a honeycomb pitch P, wherein the cross-sectional area of the flow passage is determined as the cross-sectional area $(P-b)^2$, while the circumferential length of the flow passage cross-section is calculated as the circumferential length of cross-section of each passage, i.e., $4 \times (P-b)$. The aforesaid equivalent diameter therefore is computed as $(P-b)$. Further, the aforesaid void ratio ($\epsilon$) is calculated in accordance with the equation of:

$$\text{void ratio } (\epsilon) = (P-b)^2/P^2$$

and the ratio (heat transmission area: A)/(net volume of heat accumulator: Gm) is calculated in accordance with the following equation:

$$A/Cm = 4(P-b)/(P^2-(P-b)^2)$$

According to a preferred embodiment of the present invention, the switching cycle time ($\tau$) is preset to be a value not longer than 60 sec, and the heat accumulator has the void ratio ($\epsilon$) of a value which corresponds to the volumetric efficiency (Q/V) of a value not less than 75% of the maximum value (Q/V)max. More preferably, the honeycomb wall thickness has an upper limit corresponding to the void ratio value ($\epsilon$) which provides the volumetric efficiency (Q/V) amounting to 90% of the maximum value (Q/V)max.

From another aspect of the invention, the switching cycle time ($\tau$) is preset to be a value not longer than 60 sec, and the heat accumulator has the void ratio ($\epsilon$) of a value which corresponds to the maximum value (Q/V)max of volumetric efficiency selected within a range of ±50% of the preset value of the switching cycle time ($\tau$).

From still another preferred aspect of the invention, the switching cycle time ($\tau$) is preset to be a value not longer than 60 sec, and the heat accumulator has a honey-comb wall thickness which is selected within the range of ±50% of the honeycomb wall thickness b which corresponds to the void ratio ($\epsilon$).

The above and other objects, features and advantages of the present invention will become clear from the following description of the preferred embodiments when the same is read in conjunction with the accompanying drawings.

BRIEF DESCRIPTION OF THE DRAWINGS

FIGS. 3a and 3b are schematic illustrations of the combination system shown in FIG. 1, illustrative of the paths of combustion air and exhaust gas in a mode in which a four-way valve is in a first position and in another mode in which the four-way valve is in a second position, respectively;

DESCRIPTION OF THE PREFERRED EMBODIMENTS

Preferred embodiments of the present invention will be described in detail with reference to the accompanying drawings.

Figure 1:
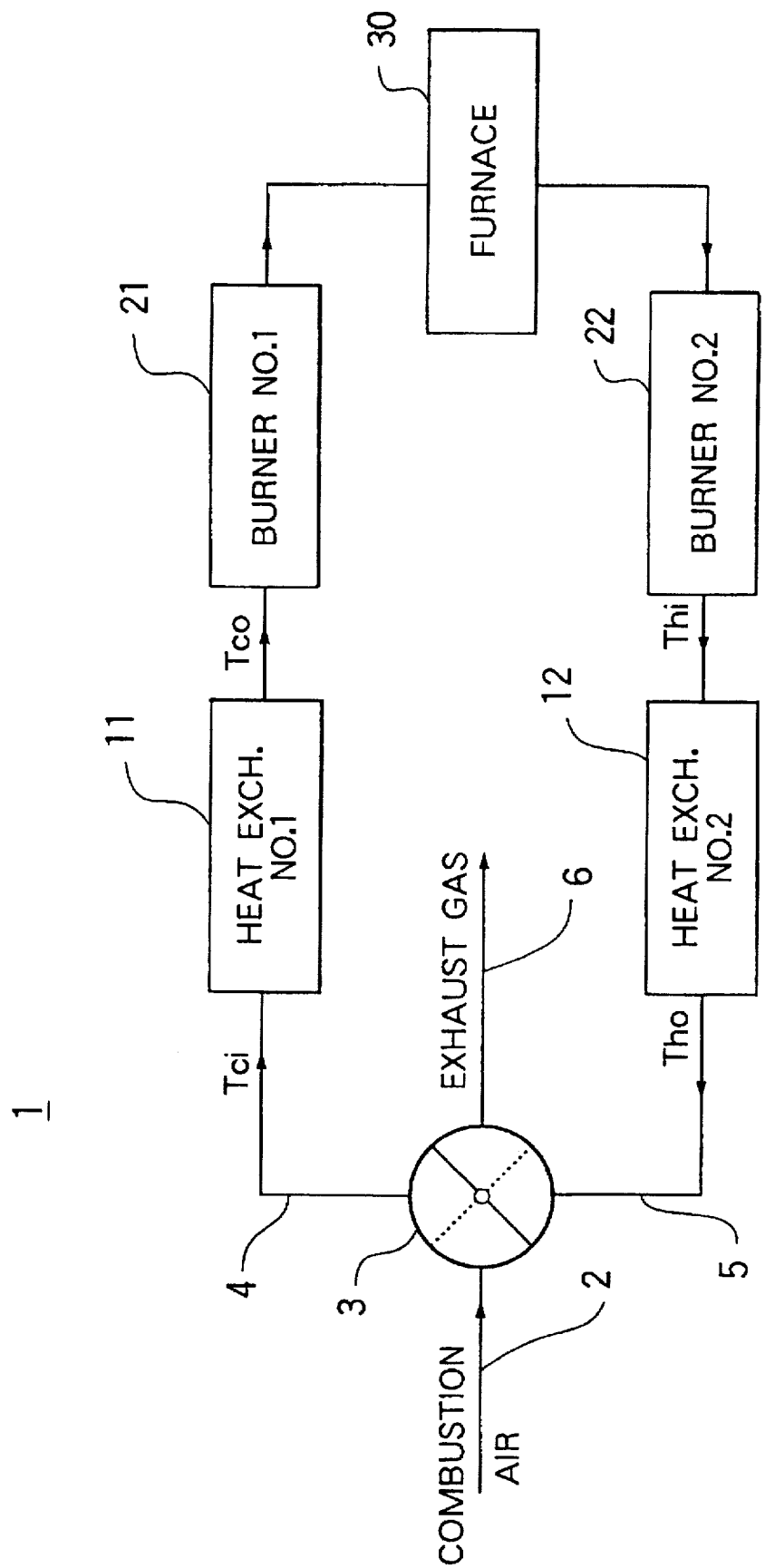
FIG. 1 is a schematic illustration of the whole construction of a high-cycle regenerative combustion system incorporating a regenerative heat exchanger embodying the present invention.
Figure 2:
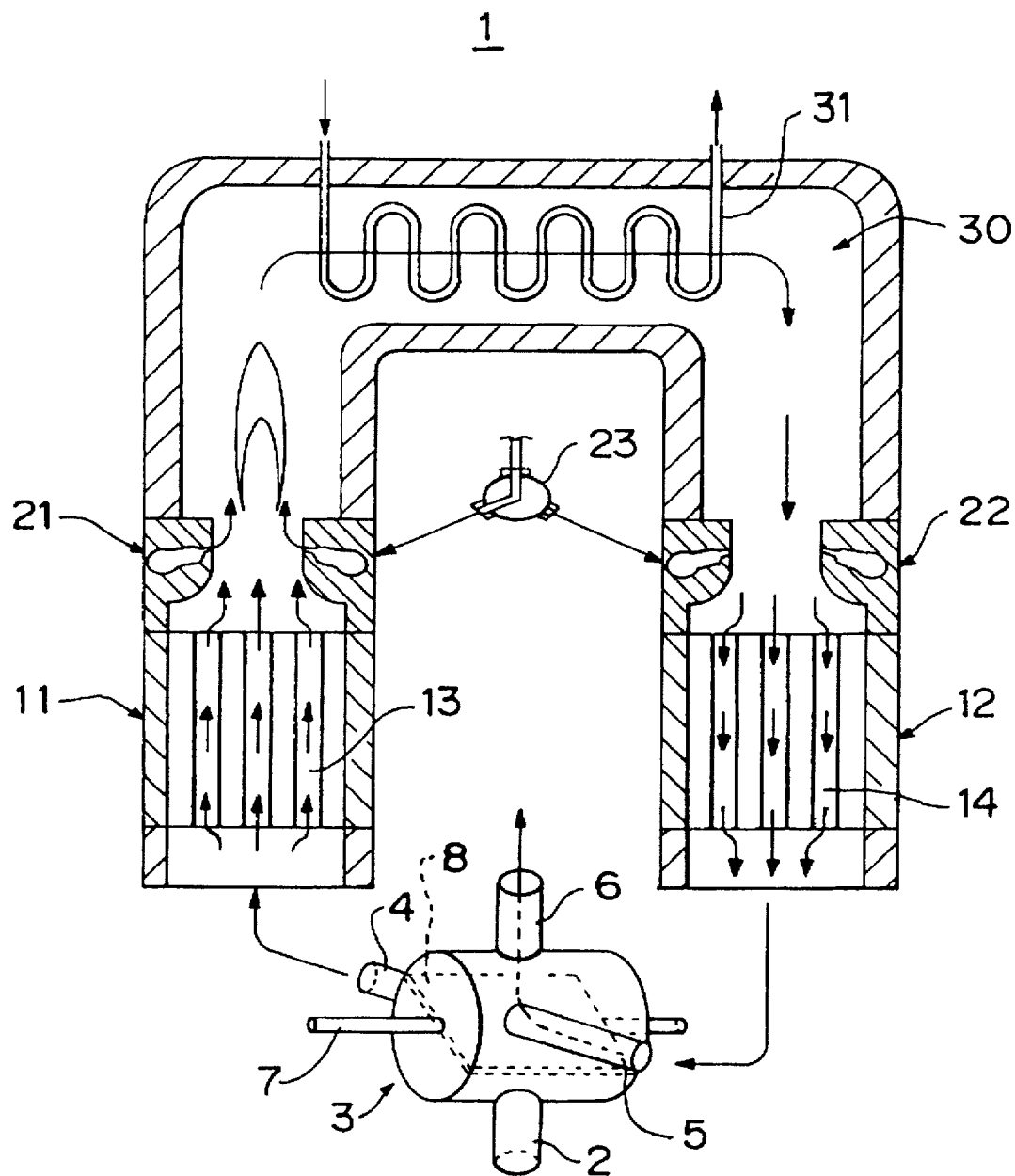
FIG. 2 is a schematic illustration of the construction of the high-cycle regenerative combustion system shown in FIG. 1.

FIG. 1 is a schematic illustration of the whole structure of a high-cycle regenerative combustion system (HRS) incorporating a regenerative heat exchanger or regenerator in accordance with the present invention, while FIG. 2 is a schematic illustration of the construction of the high-cycle regenerative combustion system shown in FIG. 1.

Referring to FIG. 1, a high-cycle regenerative combustion system 1 (referred to as "combustion system 1" hereinafter) has a combustion air introduction passage 2, first and second regenerative heat exchanger units 11, 12 which are arranged in parallel with each other, first and second burners 21, 22 which are disposed downstream of the heat exchanger units 11, 12 and a combustion furnace 30 which provides a combustion zone for the burners 21, 22. The introduction passage 2 is connected to first and second branch or shunt passages 4, 5 through a four-way valve 3. The first branch passage 4 communicates with the first burner 21 through the first heat exchanger unit 11, while the second branch passage 5 communicates with the second burner 22 through the second heat exchanger unit 12. The four-way valve 3 can be shifted or changed over in such a manner as to selectively provide communication between the introduction passage 2 and either one of the first and second branch passages 4, 5 while providing communication between a exhaust passage 6 and the other of the first and second branch passages 4,5. In FIG. 1, the four-way valve 3 takes a position where it allows the introduction passage 2 to be in communication with the first branch passage 4 while allowing the second branch passage 5 to be in communication with the exhaust passage 6.

Referring now to FIG. 2, the first and second burners 21, 22 are connected to a fuel supply system through a fuel supply valve 23, which is a three-way valve. The fuel supply valve 23 is controlled by a controller (not shown) so as to alternately supply a fuel to one of the first and second burners 21, 22, whereby the first and second burners 21, 22 are alternately put into operation. The switching between the first and second burners 21, 22 is conducted at a predetermined cycle time which is set to be not longer than 60 seconds. The flame formed on the first or second burner 21, 22 is directed to a heat receptor 31 which is provided in the combustion furnace 30. In the illustrated embodiment, the heat receptor 31 is defined as a heat-transfer coil or heated tube, through which a medium flows to be heated. Each of the first and second burners 21, 22 is provided with attachments or accessories such as a pilot burner, ignition transformer and so forth. Depiction of those attachments or accessories, however, are omitted from the drawings for the purpose of simplification of illustration.

The four-way valve 3 has a plate-like valve body 8 which is fixed to a rotary shaft 7 and the shaft 7 is rotated by a driving device (not shown) so as to switch the position of the valve body 8. The driving device rotates the rotary shaft 7 in synchronization with the switching between the first and second burners 21,22, so as to hold the valve member 8 at either of first and second positions. In the first position, the valve member 8 allows the first passage 4 to communicate with the introduction passage 2 and the second passages 5 to communicate with the exhaust passage 6, during the operation of the first burner 21, whereas in the second position, the vale member 8 allows the first passages 4 to communicate with the exhaust passage 6 and the second passages 5 to communicate with the introduction passage 2, during the operation of the second burner 22.

When the first burner 21 is in operation, the exhaust gas, flue gas or burnt gas from the combustion furnace 30 is discharged through the second heat exchanger unit 12 so that the waste heat energy of the exhaust gas is accumulated in the second heat exchanger unit 12. In the subsequent phase in which the second burner 22 operates, the accumulated heat is transferred from the second heat exchanger unit 12 to the combustion air introduced through the second branch passage 5, thereby pre-heating the combustion air. Conversely, when the second burner 22 is in operation, the waste heat of the exhaust gas from the furnace 30 is accumulated in the first heat exchanger unit 11. In the subsequent phase in which the first burner 21 operates, the accumulated heat is delivered form the first heat exchanger unit 11 to the combustion air introduced through the first branch passage 4, thereby pre-heating the combustion air.

In the illustrated embodiment, honeycomb-type ceramics heat accumulators, which is so-called a ceramic regenerator, are used in the first and second heat exchanger units 11, 12. The combustion air and the exhaust gas are caused to flow through a plurality of flow passages or channels 13, 14 formed in the first and second heat exchangers.

Figure 4A:
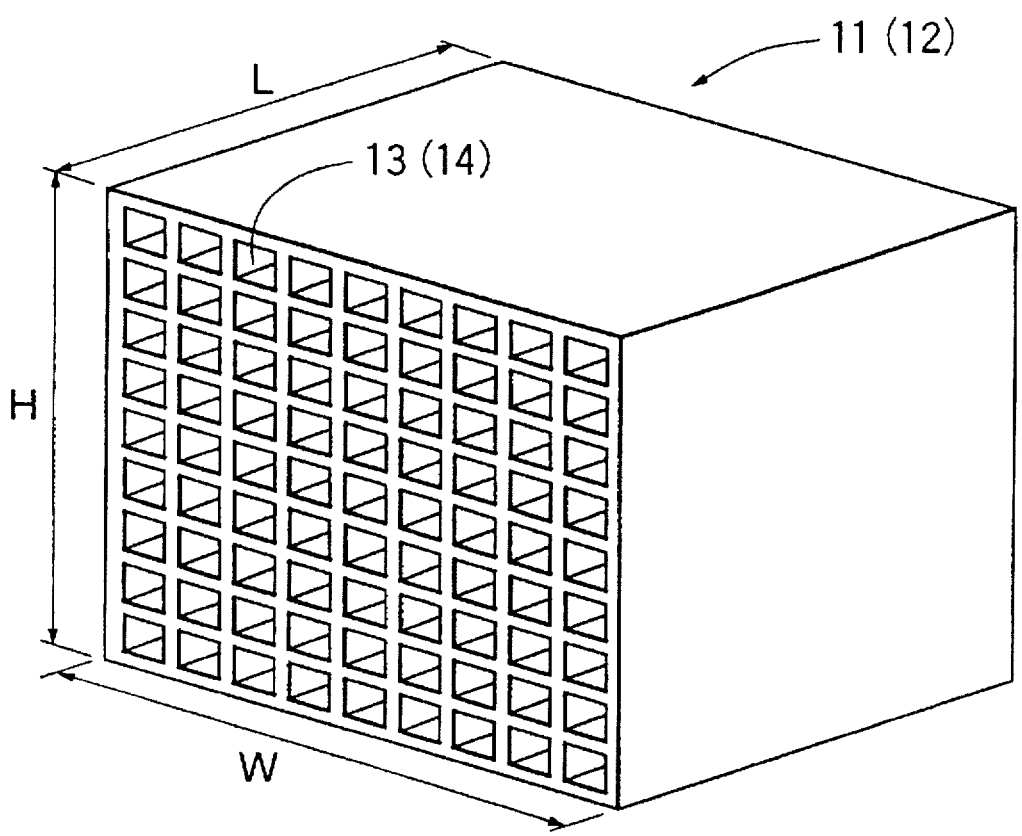
FIGS. 4a and 4b are a perspective view and a fragmentary enlarged perspective view showing the constructions of first and second heat exchangers used in the system shown in FIG. 1.
Figure 4B:
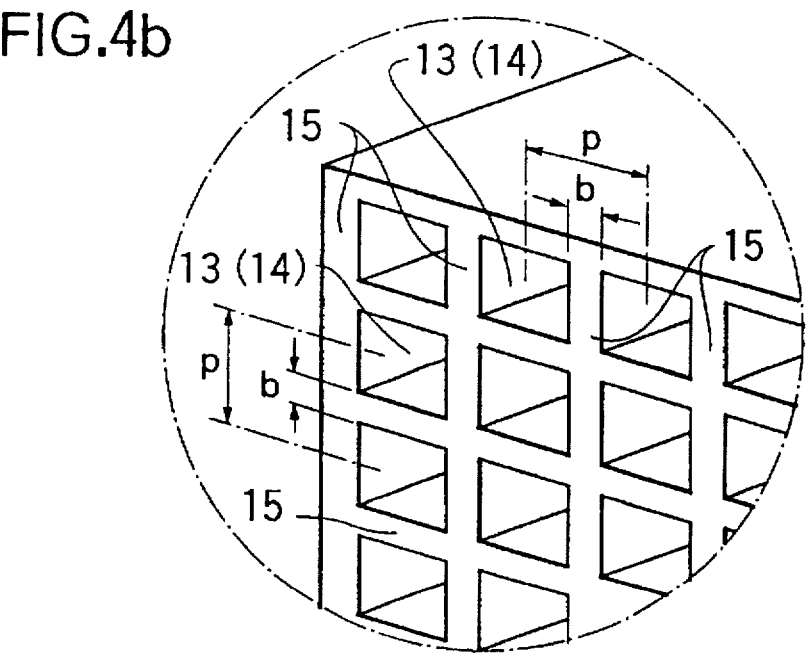

FIG. 3(a) shows a schematic fluid-flow diagram of the combustion air and the exhaust gas when the four-way valve is in the first position, and FIG. 3(b) shows a schematic fluid-flow diagram of the combustion air and the exhaust gas when the four-way valve is in the second position. FIGS. 4(a) and 4(b) are a perspective view and a fragmentary enlarged perspective view showing the construction of each of the first and second heat exchanger units 11, 12.

When the four-way valve is in the first position as shown in FIG. 3(a), combustion air of a relatively low temperature (Tci) through the introduction passage 2 is passed to the first heat exchanger unit 11 through the first branch passage 4 and is brought into contact with the heat transfer surface of the first heat exchanger unit 11 so as to be heated by a heat exchange with the first heat exchanger unit 11. The combustion air thus pre-heated up to a comparatively high temperature (Tco) is fed from the first heat exchanger unit 11 to the first burner 21. Meanwhile, the exhaust gas of high temperature (Thi) from the furnace 30 is caused to pass through the second heat exchanger unit 12 to be brought into contact with the heat transfer surface of the second heat exchanger unit 12, thereby heating the second heat exchanger unit 12 by a heat exchange therebetween. The exhaust gas thus cooled down to a comparatively low temperature (Tho) is then caused to flow through the second branch passage 5 so as to be discharged through the exhaust passage 6.

Then, the four-way valve is switched from the first position to the second position as shown in FIG. 3(b), so that the combustion air of a low temperature (Tci) from the introduction passage 2 is fed through the second branch passage 5 to the second heat exchanger unit 12, which has been heated by the exhaust gas. Therefore, the combustion gas is heated as a result of the heat exchange with the second heat exchanger unit 12, whereby the combustion air is pre-heated up to a relatively high temperature (Tco) to be delivered from the second heat exchanger unit 12 to the second burner 22. Meanwhile, the exhaust gas of a high temperature (Thi) from the furnace 30 is caused to pass through the first heat exchanger unit 11 so as to heat the first heat exchanger unit 11 through heat exchange therebetween. The exhaust gas thus cooled down to a comparatively low temperature (Tho) is then caused to flow through the first branch passage 4 so as to be discharged via the discharge passage 6.

Thus, the regenerative heat exchangers constituting the heat accumulators or regenerators, i.e., the first and second heat exchanger units 11, 12, are alternately and switchingly brought into heat-transfer contact with a high temperature fluid (exhaust gas) and a low temperature fluid (combustion air) so as to take up heat from the high temperature fluid and to transfer the heat to the low temperature fluid, thereby performing heat exchange between the high temperature fluid and the low temperature fluid. This kind of heat exchanger having the above described construction, when the cycle time of switching of the fluid passage is set to be a relatively short period of 60 seconds or shorter, theoretically can attain the temperature efficiency up to a range between 70 to 100%, in contrast to the conventional heat exchangers which could merely provide only a low temperature efficiency in a range of 60 to 70% at the highest.

As shown in FIGS. 4(a) and 4(b), the width W, the length L and the height H of each of the first and second heat exchanger units 11, 12 are so determined that each heat exchanger unit can be appropriately incorporated in the combustion system 1. The heat exchanger units have lattice-like honeycomb structures with a plurality of flow passages or channels 13, 14 of a square cross-section. The thickness b of the cell wall defining the flow channels 13, 14 and the cell pitch P of the cell walls 15 are set to the following predetermined values, respectively.

In each of the first and second heat exchanger units 11, 12 of the illustrated embodiment, the cell wall thickness b and the cell wall pitch P are determined so that they correspond to a maximum value of a volumetric efficiency and ensure a temperature coefficient within the range of between 0.7 and 1.0. The volumetric efficiency is an index indicative of the heat transmission rate per the volume of the heat accumulator inclusive of the whole cavity volume of the flow channels, and is defined by the following equation:

volumetric efficiency (Q/V) =
(heat transmission rate Q (Kcal/h)) of heat accumulator/(overall volume ($m^3$) of heat accumulator inclusive of volume of flow channels)

The temperature efficiency ηt is an index which indicates, in term of fluid temperatures, the ratio of the transferable calorific value possessed by the high temperature fluid to the calorific value received by the low temperature fluid. The temperature efficiency is generally expressed by the following equation:

temperature efficiency (ηt) =
(low temperature fluid outlet temperature Tco −
low temperature fluid inlet temperature Tci)/
(high temperature fluid outlet temperature Tho −
low temperature fluid inlet temperature Tci)

The volumetric efficiency (Q/V) is an index of the performance of the heat accumulator, which is newly proposed by the present inventors and which is related both to the heat transmission rate Q and the overall volume V of the heat accumulator. This index can be effectively used in substantially improving the temperature coefficient of the heat exchanger while reducing the overall size of the heat exchanger. By determining the cell wall thickness b and the cell wall pitch P under the conditions which maximize the value of the volumetric efficiency, it is possible to improve the temperature efficiency of the heat exchanger while limiting increase in the overall volume of the heat exchanger.

In the combustion system 1 as described above, it is assumed that the low temperature fluid (i.e., the combustion air) and the high temperature fluid (i.e., the exhaust gas) have an equal value of water equivalent and an equal heat transmission coefficient, and the thickness b and the pitch P of the cell walls 15 are set to be values which substantially correspond to the maximum value of the volumetric efficiency determined by the following equation:

$$Q/V = \eta_t(Thi - Tci)(1-\epsilon) \cdot CW/\tau \cdot PM2/PM1 \quad (1)$$

The temperature efficiency in the equation (1) is determined by the following equation (2):

$$\eta_t = 1/(1 + 2/PM1 + \exp(-2PM1/PM2)) \quad (2)$$

PM1 and PM2 in the equation (2) are determined as follows:

$$PM1 = hA/Cg \cdot Gg$$

$$PM2 = hA\tau/Cm \cdot Gm$$

where the respective symbols represent the following factors:

| | |
|---|---|
| Tci: inlet temperature of the low temperature fluid | °C. |
| Thi: inlet temperature of the high temperature fluid | °C. |
| ε: void ratio or voidage of the heat accumulator | |
| A: heat transmission area | m² |
| h: heat transmission coefficient | Kcal/m² °C. |
| τ: switching cycle time | hr |
| Cg: constant-pressure specific heat of gas | Kcal/m³ N °C. |
| Gg: flow rate of the fluid | m³ N/h |
| Cm: specific heat of the heat accumulator | Kcal/m³ °C. |
| Gm: net volume of the heat accumulator | m³ |

The equation (2) has been originally created by the inventors and can suitably be used in calculating the temperature efficiency $\eta_t$.

The void ratio ε is the ratio of the volume of the flow channels (volume of voids) in the heat accumulator to the overall volume of the heat accumulator inclusive of the flow channels, and is determined by the following equation:

void ratio=flow channel volume (cavity volume)/overall volume of heat accumulator In the illustrated embodiment, the void ratio ε is calculated as follows:

$$\text{void ratio } (\epsilon) = (P-b)^2/P^2$$

The ratio of the transmission area (A) to the net volume (Gm) of the heat accumulator is calculated in accordance with the following formula:

$$A/Gm = 4(P-b)/(P^2-(P-b))$$

In the illustrated embodiment, the temperature efficiency $\eta_t$ is beforehand set to fall within a range of between 0.7 and 1.0, preferably to 0.9. The combustion air inlet temperature, i.e., the low temperature fluid inlet temperature (Tci) is set at 20° C., while the exhaust gas inlet temperature, i.e., the high temperature fluid inlet temperature (Thi) is set at 1000° C.

At the same time, the specific heat Cm of the heat accumulator is set to be a value as shown below. In the illustrated embodiment, the heat accumulators constituting the first and second heat exchangers are assumed to be made of ceramics, and therefore, the value 406 is adopted as the value of the specific heat Cm.

| Materials | Specific heat Cm |
|---|---|
| Ceramics | 406 |
| Steel | 860 |

The heat transmission coefficient (h) mentioned above is calculated in accordance with the following equation (3):

$$h = 3.5 \, T^{0.23} Vn^{0.8}/d^{0.2} \quad (3)$$

wherein the respective symbols represent the following factors:

d: equivalent diameter(m) =
4 × (cross-sectional area of flow channel)/
(circumferential length of cross-section of flow channel)

T: mean temperature of fluid (K)
T = 273 + (Thi + Tci)/2

Vn: fluid flow velocity (mN/s) converted to values under standard state (0° C. 1 atm)

The equation (3) is a specific equation for determining the heat transmission coefficient h and has been found by the inventors through experiments. The flow channel cross-sectional area is the cross-sectional area of each of the flow channels 13, 14 and therefore, can be determined by (pitch P–wall thickness b)². The circumferential length of the flow channel cross-section is the circumferential length of the cross-section of each of the flow channels 13, 14 and therefore, it can be expressed by 4×(Pitch P –Wall thickness b). The equivalent diameter therefore is simply calculated, based on (Pitch P–Wall thickness b).

The pressure loss (ΔP/L) across the flow passage per unit length of the passage is preferably set to fall within the range of between 1000 and 2000 mmH₂O/m. In the illustrated embodiment, the pressure loss is set to be e.g., 1500 mmH₂O/m, and the flow velocity of the fluid was calculated in accordance with the following equation (4):

$$Vn = \sqrt{(d/1.3 \cdot 2g/\gamma n \cdot 273/T \cdot \Delta P/L)} \quad (4)$$

where the respective symbols represent the following factors:

| | |
|---|---|
| g: gravitational acceleration | 9.8 m/s² |
| L: length of fluid flow passage | m |
| γn: specific gravity of the fluid in standard state (0° C., 1 atm) | Kg/m³ N |
| ΔP: pressure loss | mmH₂O |

Figure 5:
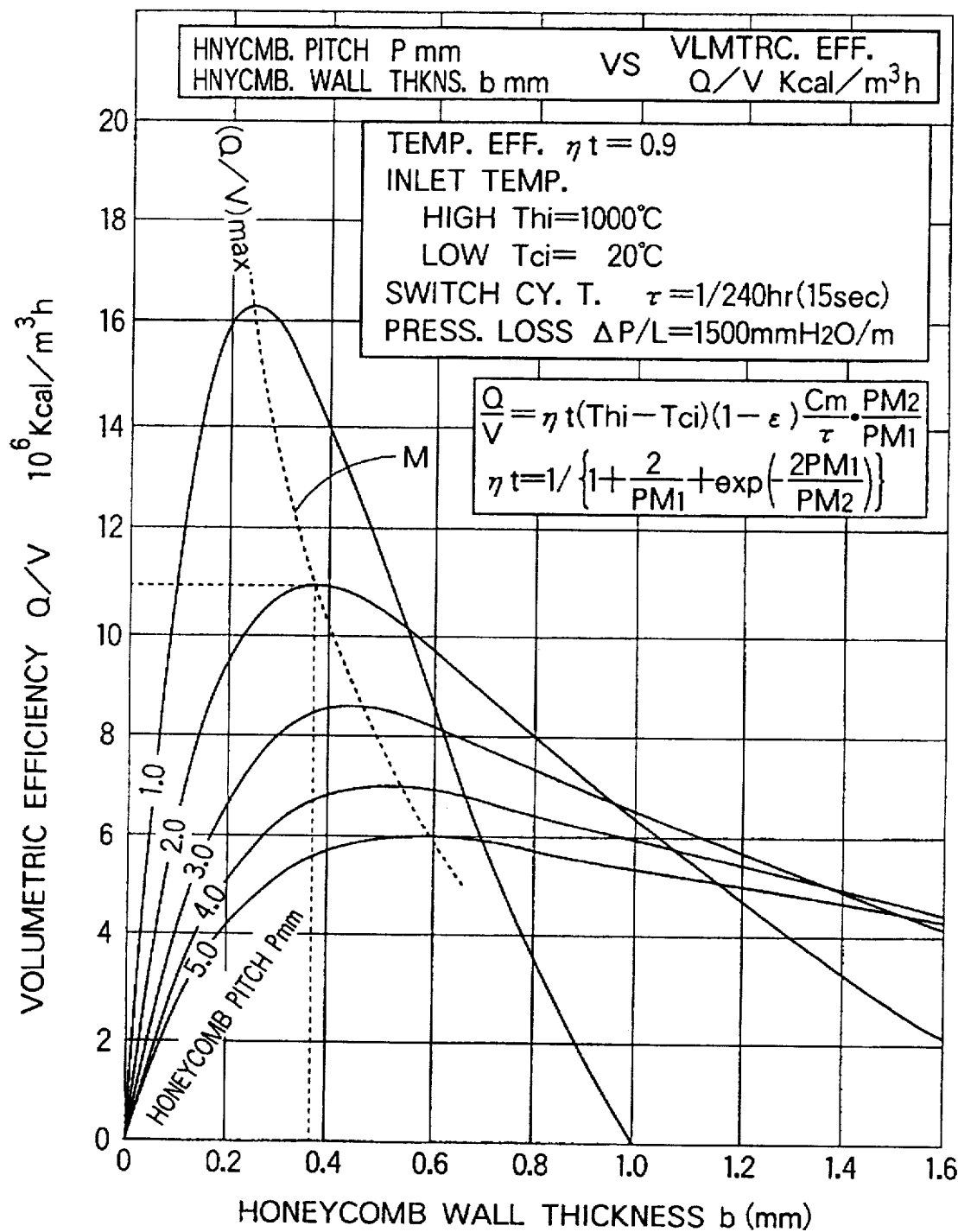
FIG. 5 is a diagram showing the values of the volumetric efficiency (Q/V) of the first and second heat exchangers calculated in accordance with the equations (1) to (4), with the switching cycle time of the four-way valve set to be 15 seconds.
Figure 6:
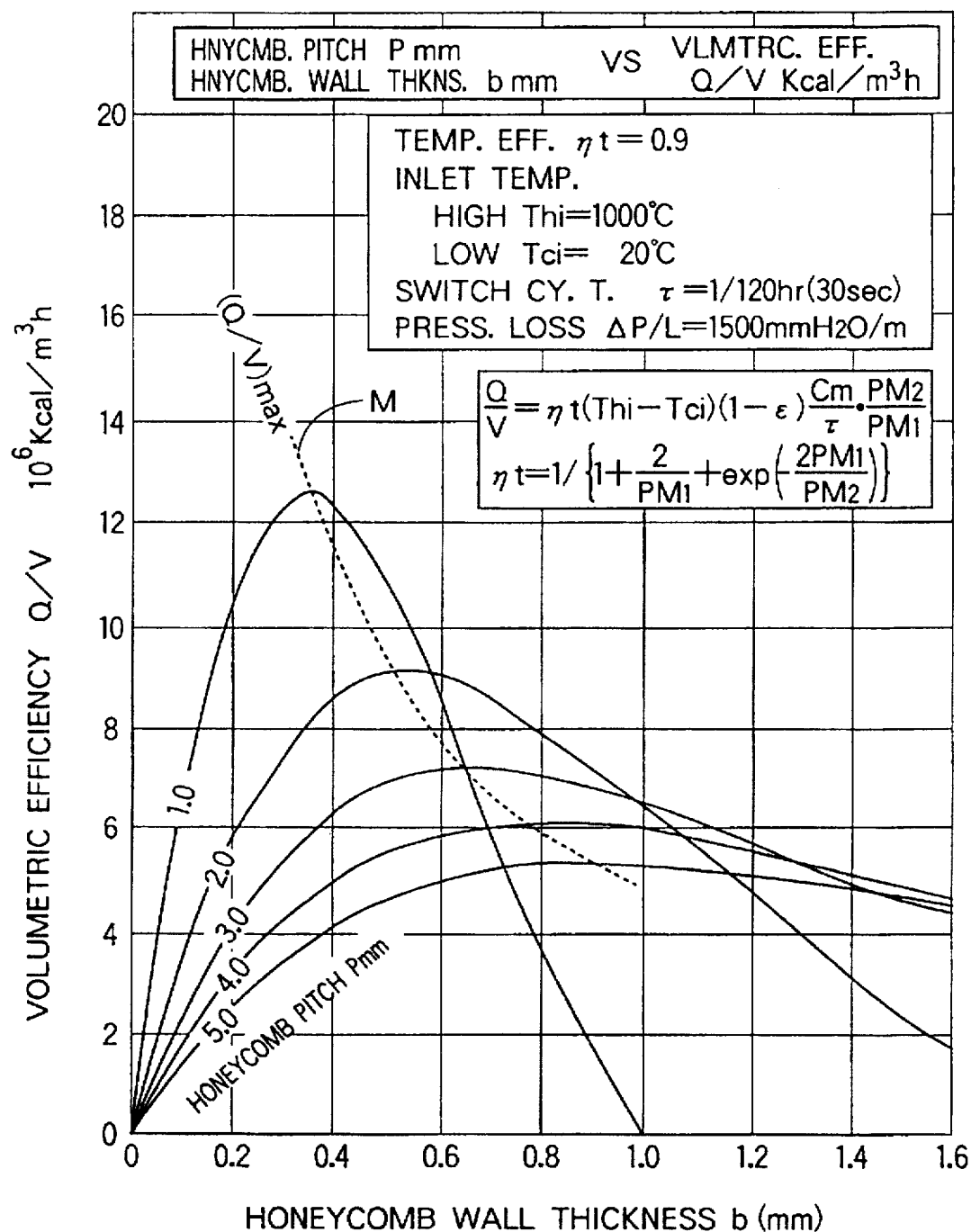
FIG. 6 is a diagram showing the values of the volumetric efficiency (Q/V) of the first and second heat exchangers calculated in accordance with the equations (1) to (4), with the switching cycle time of the four-way valve set to be 30 seconds.
Figure 7:
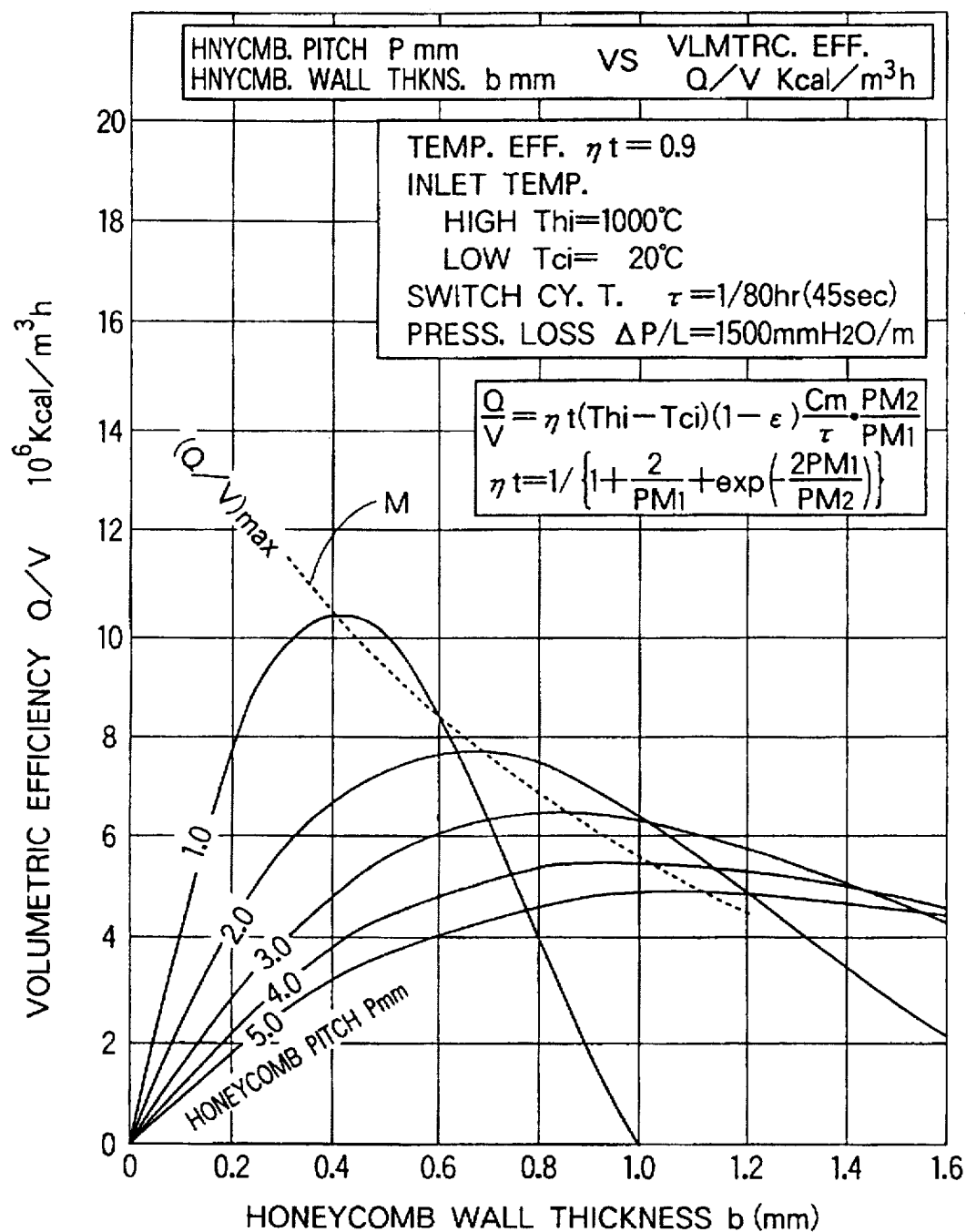
FIG. 7 is a diagram showing the values of the volumetric efficiency (Q/V) of the first and second heat exchangers calculated in accordance with the equations (1) to (4), with the switching cycle time of the four-way valve set to be 45 seconds.
Figure 8:
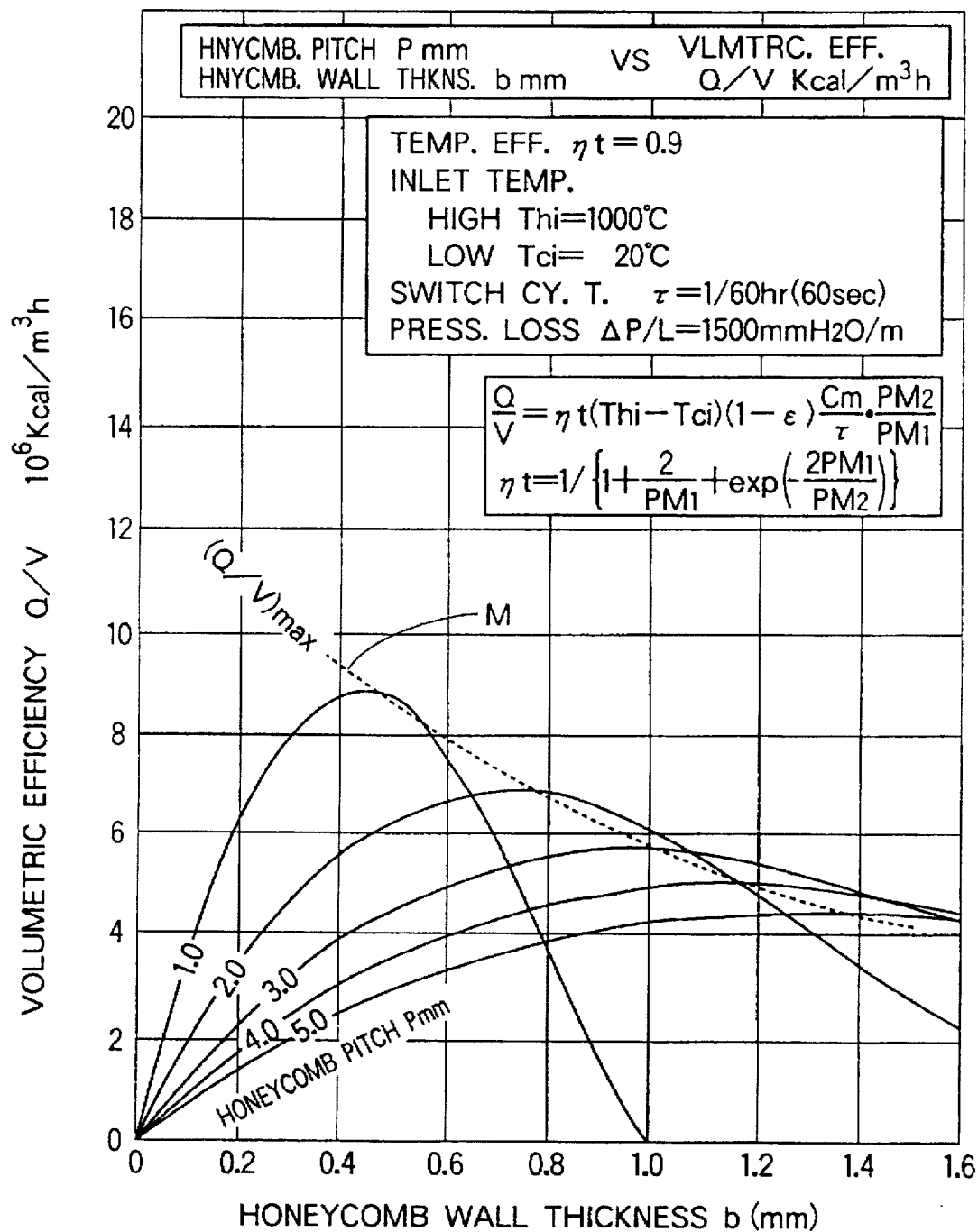
FIG. 8 is a diagram showing the values of the volumetric efficiency (Q/V) of the first and second heat exchangers calculated in accordance with the equations (1) to (4), with the switching cycle time of the four-way valve set to be 60 seconds.

FIGS. 5 to 8 are graphic diagrams showing values of the volumetric efficiency (Q/V) of the first and second heat exchanger units 11, 12 as calculated in accordance with the equations (1) to (4). More specifically, FIG. 5 shows the diagram showing the volumetric efficiency (Q/V) as obtained when the switching cycle time τ of the four-way valve 3 is set to be 15 seconds, while FIGS. 6, 7 and 8, respectively, show the values of volumetric efficiencies (Q/V) as obtained when the switching cycle time τ is set to be 30 seconds, 45 seconds and 60 seconds respectively. These values of volumetric efficiency (Q/V) are calculated on an assumption that the temperature efficiency $\eta_t$ is 0.9.

In the X-Y coordinate system in each of FIGS. 5 to 8, the X-axis shows the values of the thickness b of the cell walls 15, i.e., the honeycomb wall thickness b, while the Y-axis shows the values of the volumetric efficiency (Q/V). Each of these Figures shows, byway of example, the curves representing the functional relation between the volumetric efficiency (Q/V) and the honeycomb wall thickness b with the honeycomb pitch P as a parameter being varied from a relatively great value (5 mm) to a small value (1 mm) via a plurality of intermediate values (4 mm, 3 mm and 2 mm).

It can be understood from FIGS. 5 to 8, the function curve representing the functional relation between the volumetric efficiency (Q/V) and the honeycomb wall thickness b in each Figure exhibits a maximum or peak value (Q/V)max. Thus, the volumetric efficiency (Q/V) my have a maximum value (Q/V) max at a certain value of the honeycomb wall thickness b with respect to each value of the honeycomb pitch P. The coordinate values of the maximum value (Q/V)max indicate the optimum values of the pitch P and thickness b of the cell walls 15 of each of the first and second heat exchanger units 11, 12 used in the present invention. For instance, the Y-coordinate value of the maximum value point (Q/V)max of the volumetric efficiency (Q/V) for the honeycomb pitch P=2 mm, is located to be approximately $10.9 \times 10^6$ Kcal/m$^3$Nh. At the same time, the X-coordinate value of this maximum value point, i.e., approximately 0.36 mm, is determined as being the optimum value of the cell wall thickness b. Thus, the cell wall pitch P and the cell wall thickness b can be optimally determined to be P=2 mm and b=0.36 mm, respectively, in order to maximize the value of the volumetric efficiency (Q/V).

In each of FIGS. 5 to 8, the coordinate points of the maximum value points (Q/V)max for different values of honeycomb pitches P are interconnected by a broken-line curve M, which can be termed as the maximum volumetric efficiency curve. The coordinate value of the intersection of the maximum volumetric efficiency curve M and the function curve, which represents the functional relationship between the volumetric efficiency (Q/V) and honeycomb wall thickness (b) for any given value of the honeycomb pitch P, indicates an optimum honeycomb wall thickness b optimum for the value of the pitch P.

As the switching cycle time τ increases in FIGS. 5 to 8, the maximum volumetric efficiency curve M is shifted to the lower zone on the coordinate system, and the maximum point of the volumetric efficiency (Q/V)max is shifted so as to indicate a greater honeycomb wall thickness b. It can be therefore understood that the optimum honeycomb wall thickness b with respect to a predetermined honeycomb pitch P increases in accordance with the increase in the switching cycle time τ. This means that, in order to attain the maximum volumetric efficiency (Q/V) in a longer switching cycle time τ, it is necessary to increase the honeycomb wall thickness b with respect to a predetermined value of the honeycomb pitch P.

FIGS. 9 to 12 are the other graphical diagrams showing the relationship between the honeycomb pitch P and the honeycomb wall thickness b in the first and second heat exchanger units 11, 12, as calculated in accordance with the equations (1) to (4).

More specifically, FIGS. 9 to 12 show X-Y coordinate diagrams in which the X-axis represents the values of the honeycomb pitch P and the Y-axis indicates the honeycomb wall thickness b. In each of these Figures, curves, each of which represents equal value of the volumetric efficiency (Q/V), are shown. Each of the curve is obtained by plotting and interconnecting of coordinate points of the honeycomb pitches P and honeycomb wall thicknesses b which can provide an equal value of the volumetric efficiency (Q/V) as calculated in accordance with the equations (1) to (4). These curves look like contour lines and therefore, are referred to as contour lines hereinafter. Thus, all the coordinate values of the pitch P and wall thickness b on one of the contour lines correspond to an equal value of the volumetric efficiency (Q/V).

Figure 9:
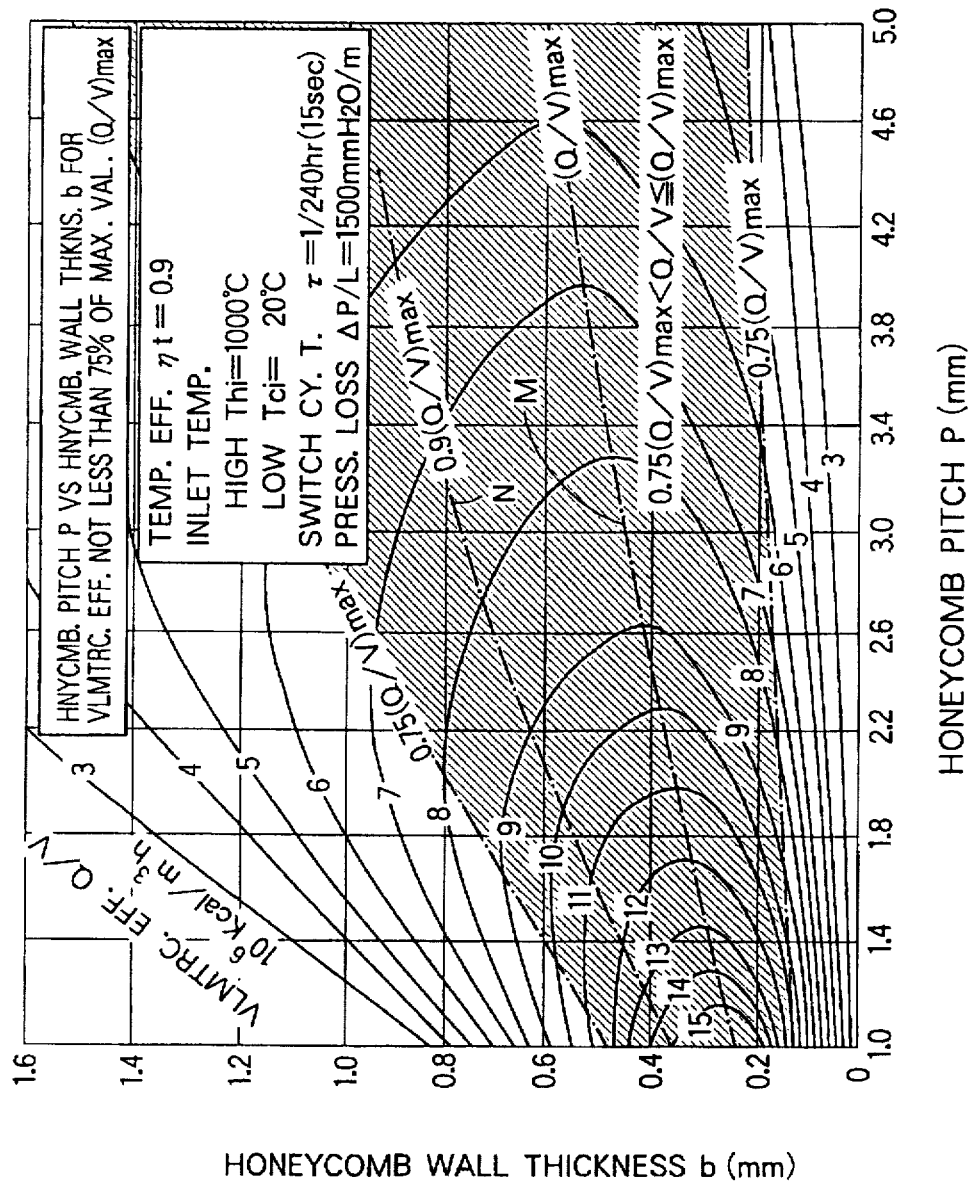
FIG. 9 is a diagram showing the relationship between the honeycomb pitch and the honeycomb wall thickness in the first and second heat exchangers as calculated in accordance with the equations (1) to (4), with the switching cycle time of the four-way valve set to be 15 seconds.
Figure 10:
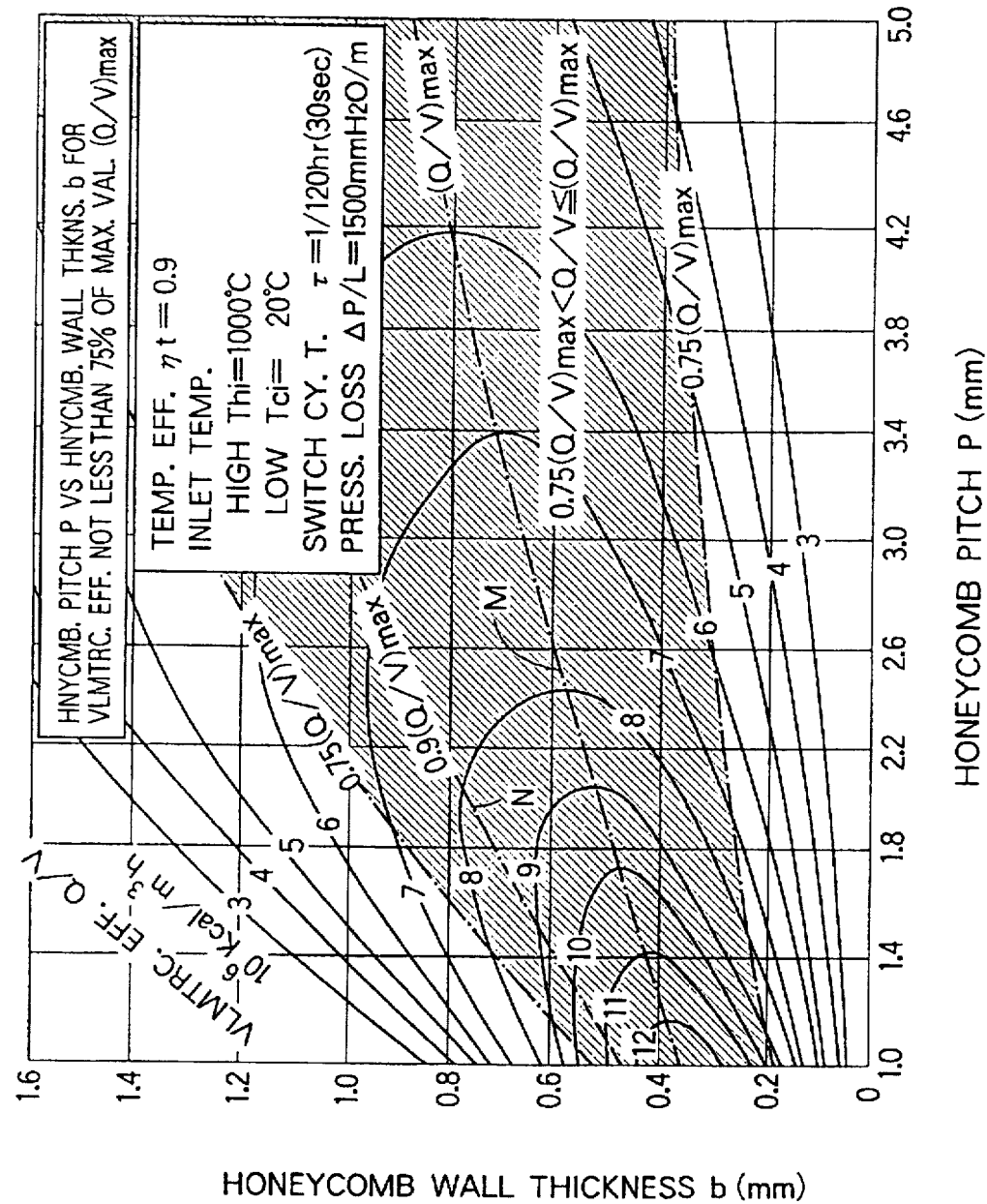
FIG. 10 is a diagram showing the relationship between the honeycomb pitch and the honeycomb wall thickness in the first and second heat exchangers as calculated in accordance with the equations (1) to (4), with the switching cycle time of the four-way valve set to be 30 seconds.
Figure 11:
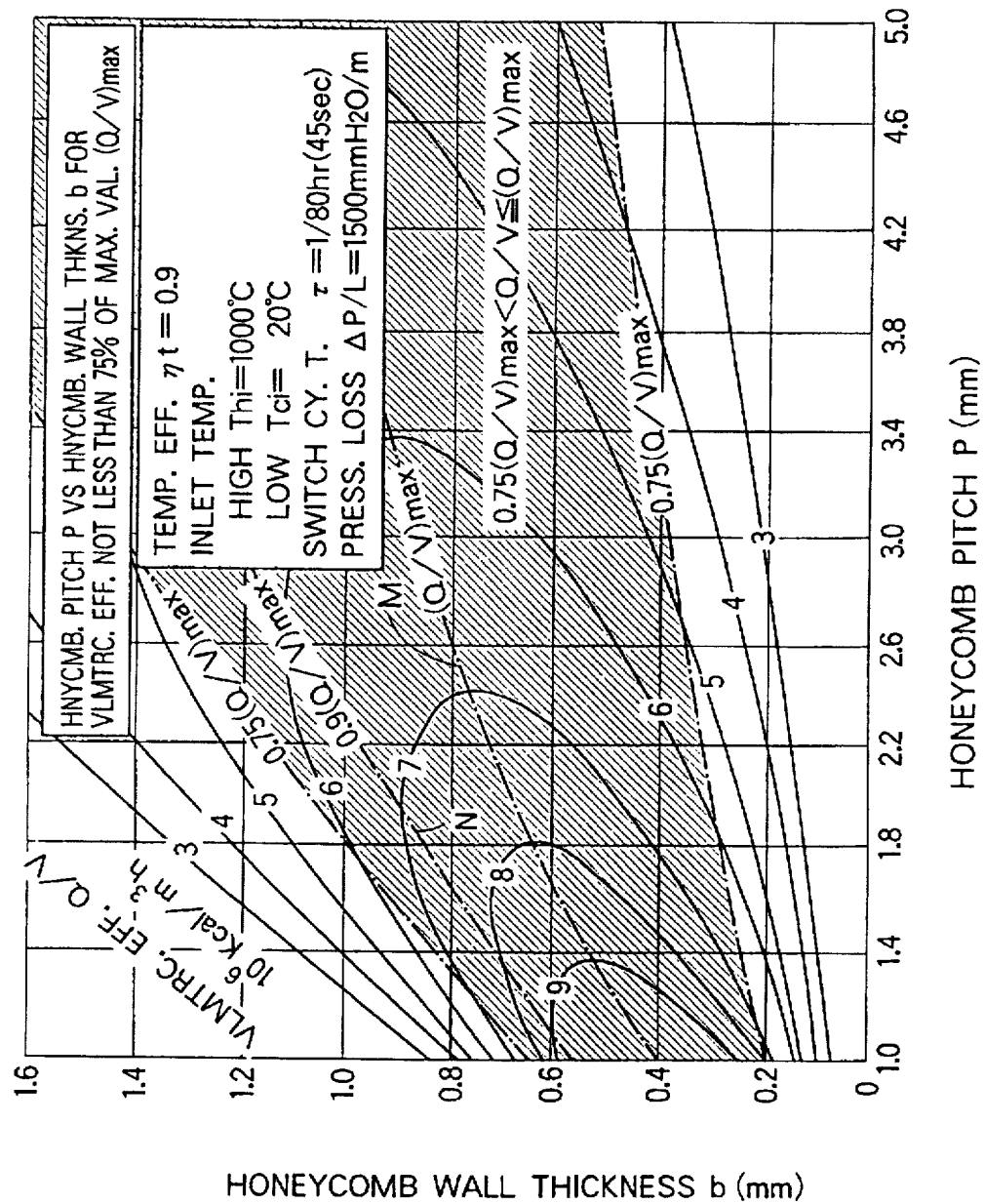
FIG. 11 is a diagram showing the relationship between the honeycomb pitch and the honeycomb wall thickness in the first and second heat exchangers as calculated in accordance with the equations (1) to (4), with the switching cycle time of the four-way valve set to be 45 seconds.
Figure 12:
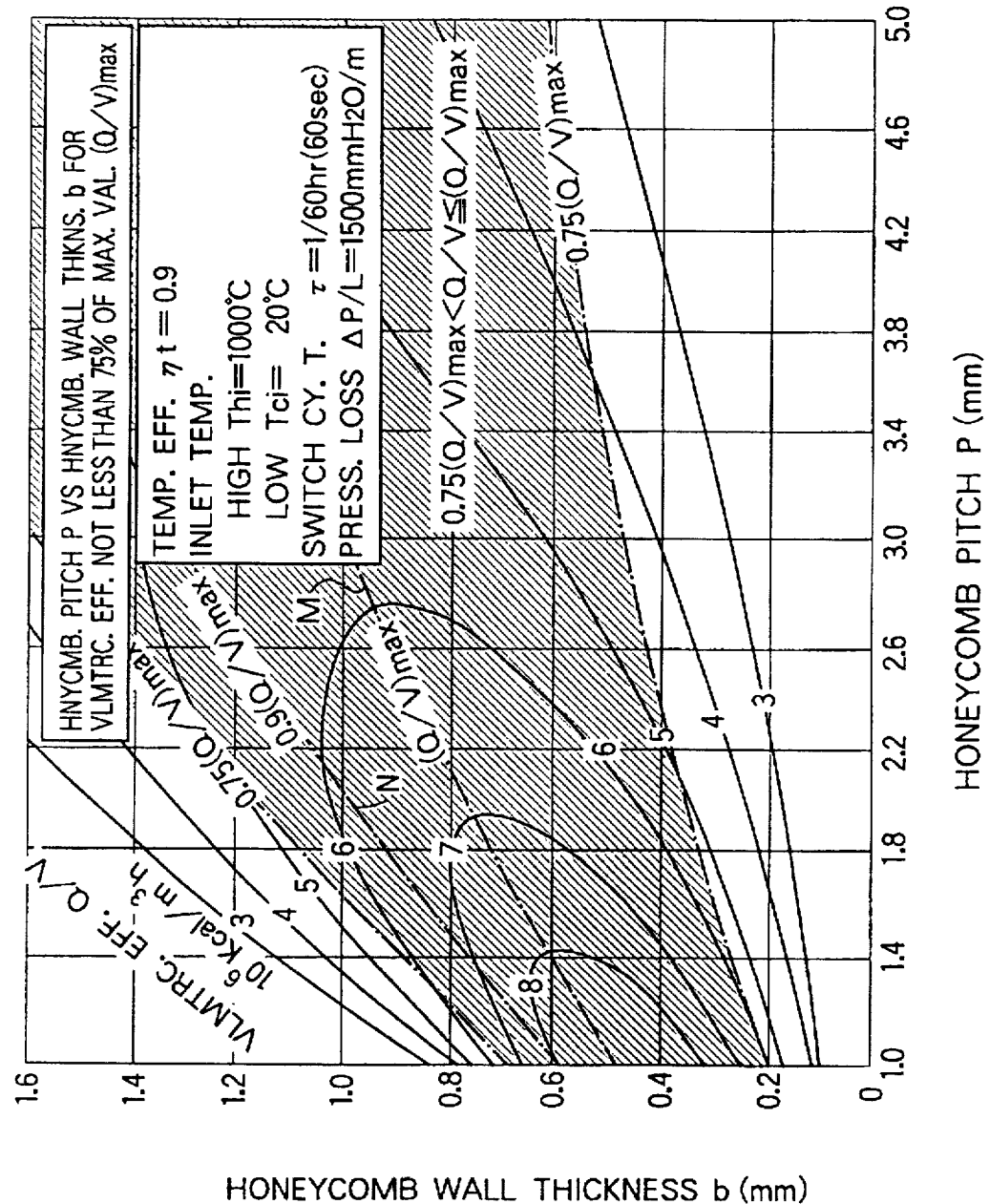
FIG. 12 is a diagram showing the relationship between the honeycomb pitch and the honeycomb wall thickness in the first and second heat exchangers as calculated in accordance with the equations (1) to (4), with the switching cycle time of the four-way valve set to be 60 seconds.

FIG. 9 shows the above-mentioned contour lines as obtained when the switching cycle time τ of the four-way valve 3 is set to be 15 seconds. FIGS. 10, 11 and 12 respectively show the contour lines as obtained when the switching cycle time τ is set to be 30 seconds, 45 seconds and 60 seconds, respectively.

A maximum volumetric efficiency curve M, which is similar to that shown in each of FIGS. 5 to 8, is shown in each of FIGS. 9 to 12 by a phantom line. As can be seen therefrom, the maximum volumetric efficiency curve M is positioned along a ridge of the contour lines, and the coordinate values on the maximum volumetric efficiency curve M indicate the values of the honeycomb pitch P (X-axis) and the values of the honeycomb wall thickness b (Y-axis), which can provide the maximum volumetric efficiency (Q/V)max. In each of FIGS. 9 to 12, the hatched area shows the region of coordinate values which correspond to values of the volumetric efficiency not less than 75% of the maximum value (Q/V)max. The honeycomb pitch P and the honeycomb wall thickness b within the hatched area can suitably be adopted as a combination of the pitch P and the wall thickness b which can provide light-weight and compact construction of each of the first and second heat exchanger units 11, 12. The values shown in FIGS. 9 to 12 have been obtained with the temperature efficiency ηt set to be 0.9.

In each of FIGS. 9 to 12, an upper limit curve N is indicated by a phantom line, which defines a preferable upper limit of the honeycomb wall thickness b to demarcate the preferred ranges of the honeycomb pitch P and the honeycomb wall thickness b. More specifically, the upper limit curve N indicates the upper limit of the region which can provide values of the volumetric efficiency (Q/V) not less than 90% of the maximum value (Q/V)max. The coordinate values, i.e., the values of the honeycomb pitch P and the honeycomb wall thickness b below the upper limit line N in the hatched area, can advantageously be used as the values of the pitch p and the thickness b of the cell walls 15 which can provide further reduction in the weight of the first and second heat exchanger units 11, 12.

Figure 13:
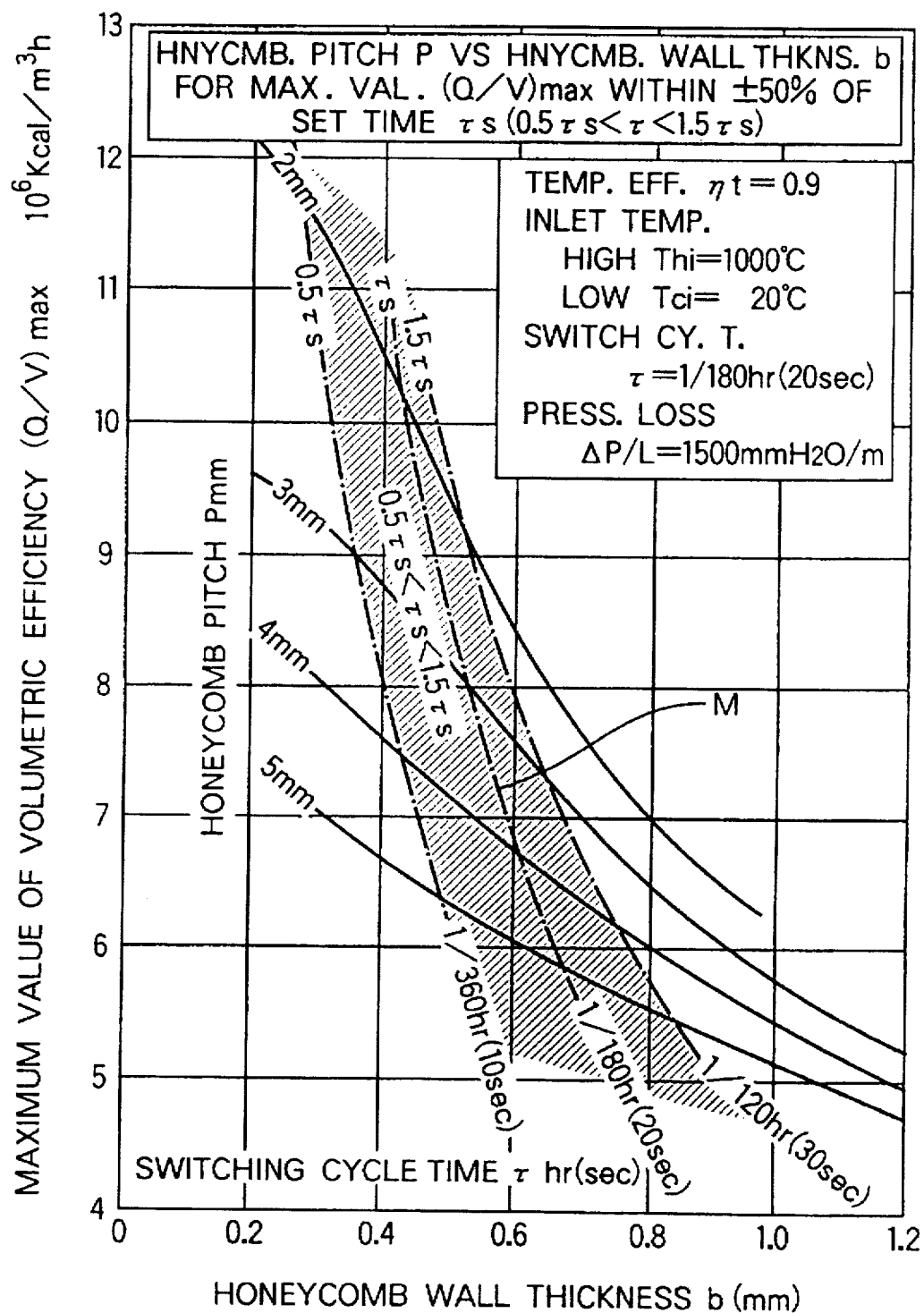
FIG. 13 is a diagram showing a variation of the volumetric efficiency peak curve as obtained when the switching cycle time of the four-way valve is varied within the range of ±50% of a preset cycle time of 15 seconds in the equations (1) to (4)
Figure 14:
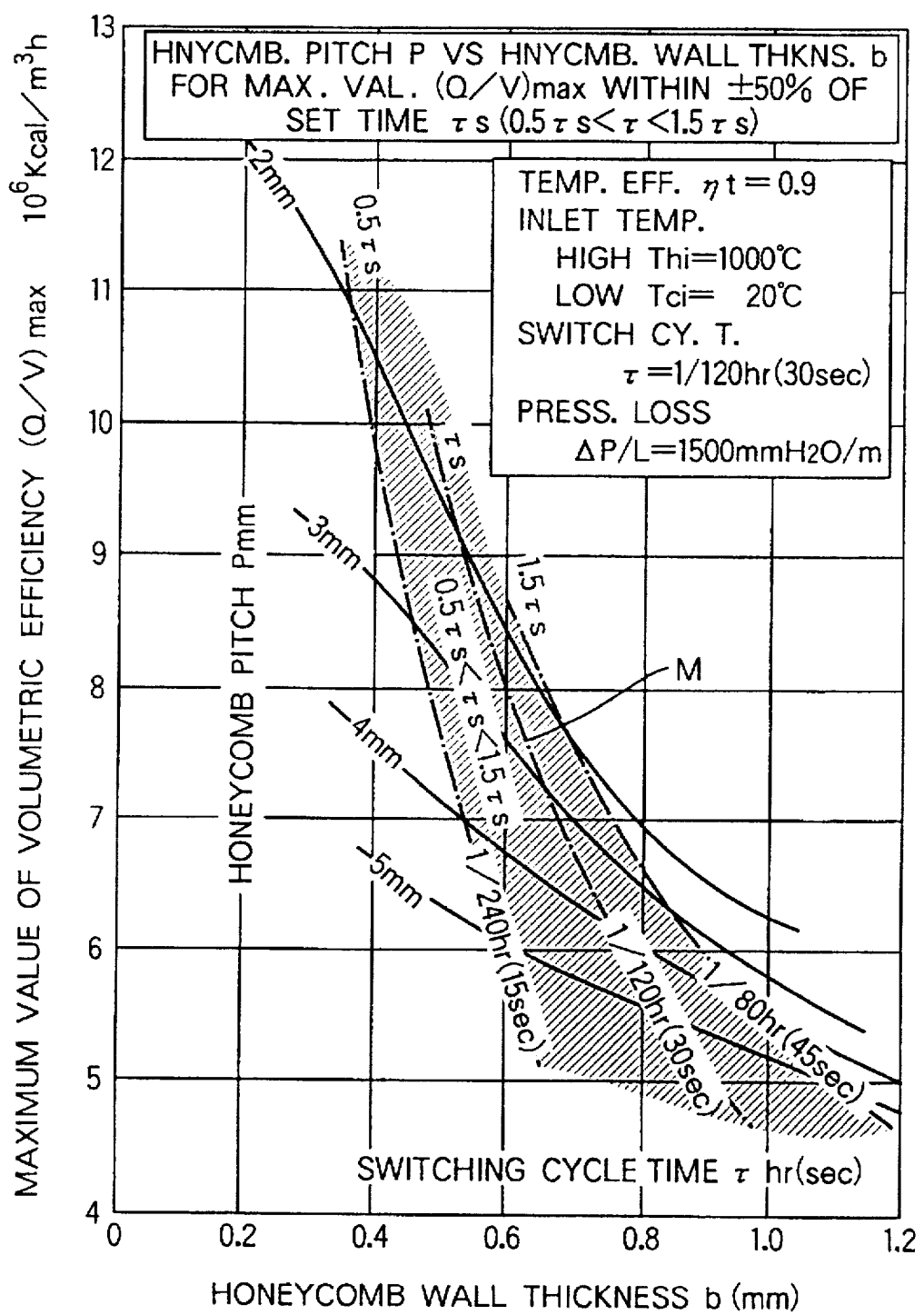
FIG. 14 is a diagram showing a variation of the volumetric efficiency peak curve as obtained when the switching cycle time of the four-way valve is varied within the range of ±50% of a preset cycle time of 30 seconds in the equations (1) to (4)
Figure 15:
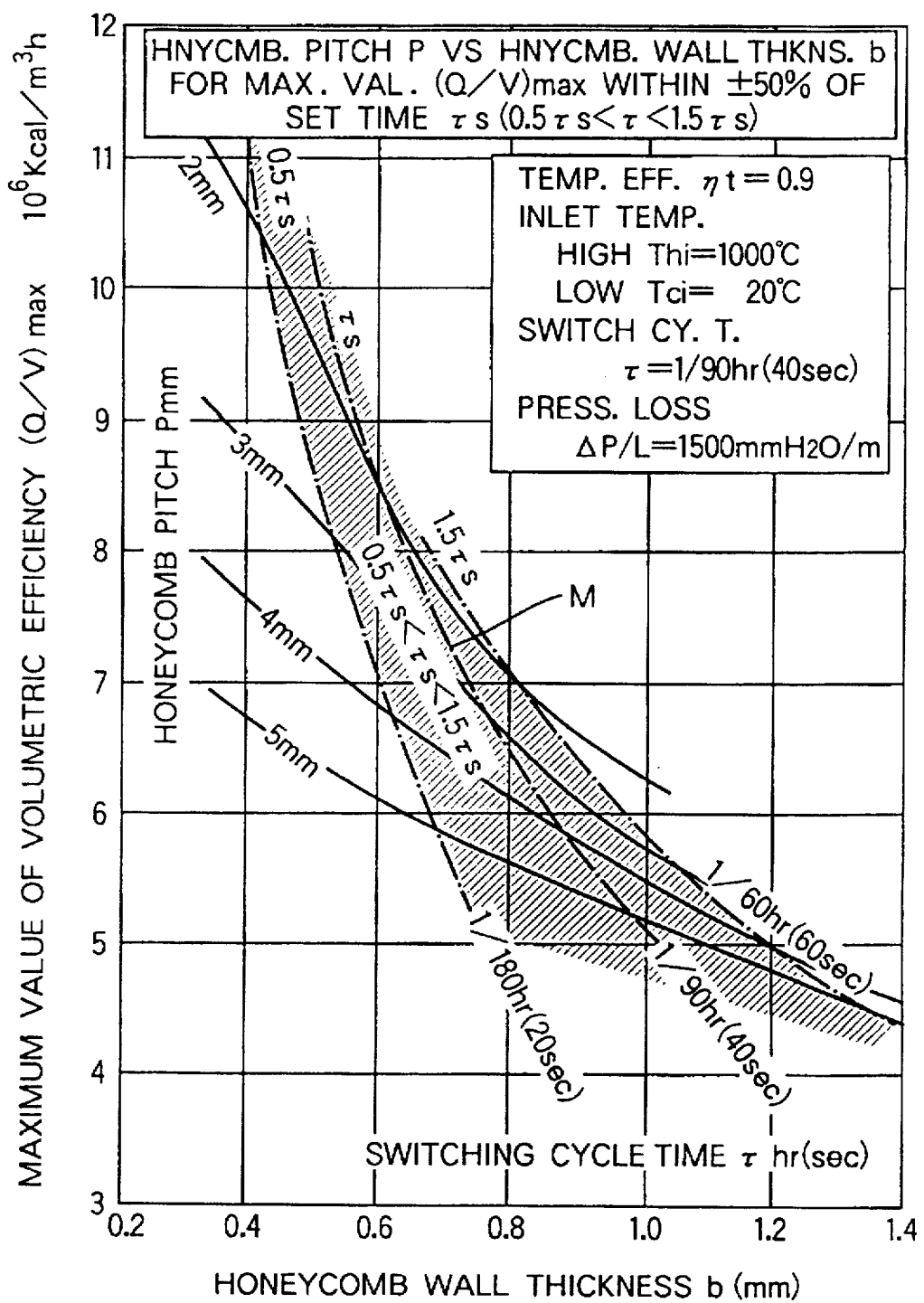
FIG. 15 is a diagram showing a variation of the volumetric efficiency peak curve as obtained when the switching cycle time of the four-way valve is varied within the range of ±50% of a preset cycle time of 45 seconds in the equations (1) to (4)
Figure 16:
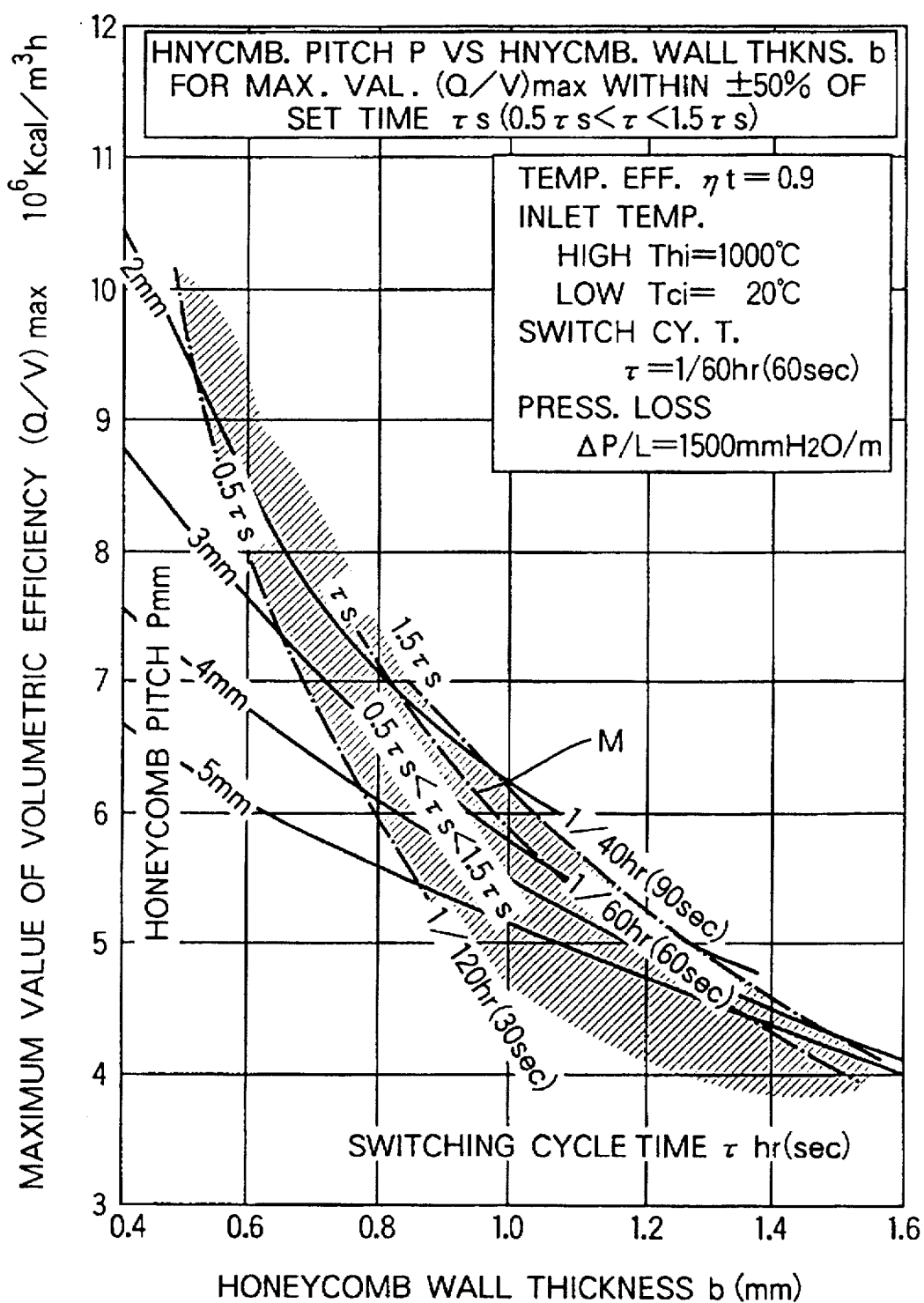
FIG. 16 is a diagram showing a variation of the volumetric efficiency peak curve as obtained when the switching cycle time of the four-way valve is varied within the range of ±50% of a preset cycle time of 60 seconds in the equations (1) to (4)
Figure 17:
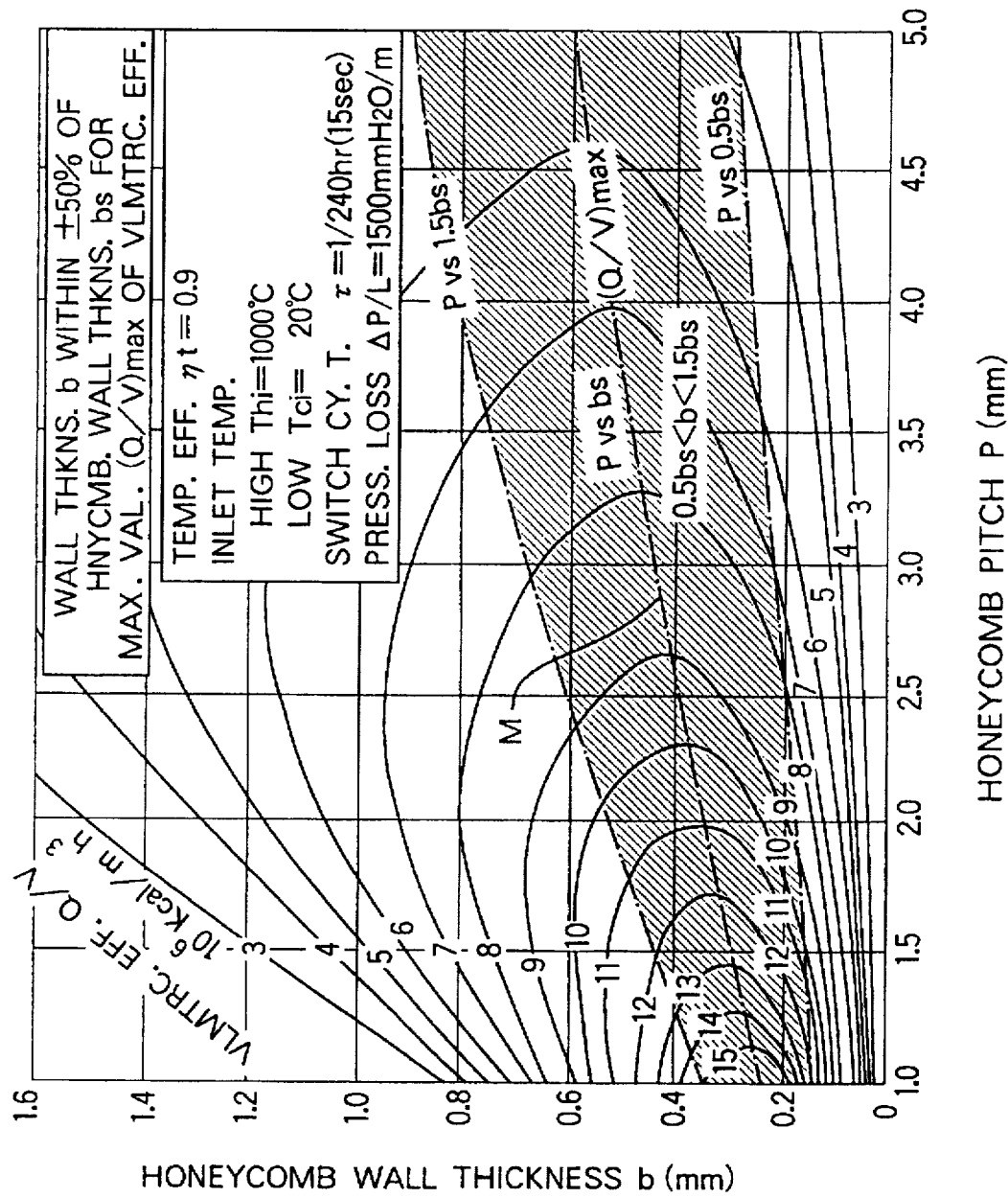
FIG. 17 is a diagram showing the relationship between the honeycomb pitch and the honeycomb wall thickness in the first and second heat exchangers as calculated in accordance with the equations (1) to (4), with the switching cycle time of the four-way valve set to be 15 seconds, wherein the hatched area shows the region of the honeycomb wall thickness and the honeycomb pitch as obtained when the honeycomb wall thickness is varied within the range of ±50%.
Figure 18:
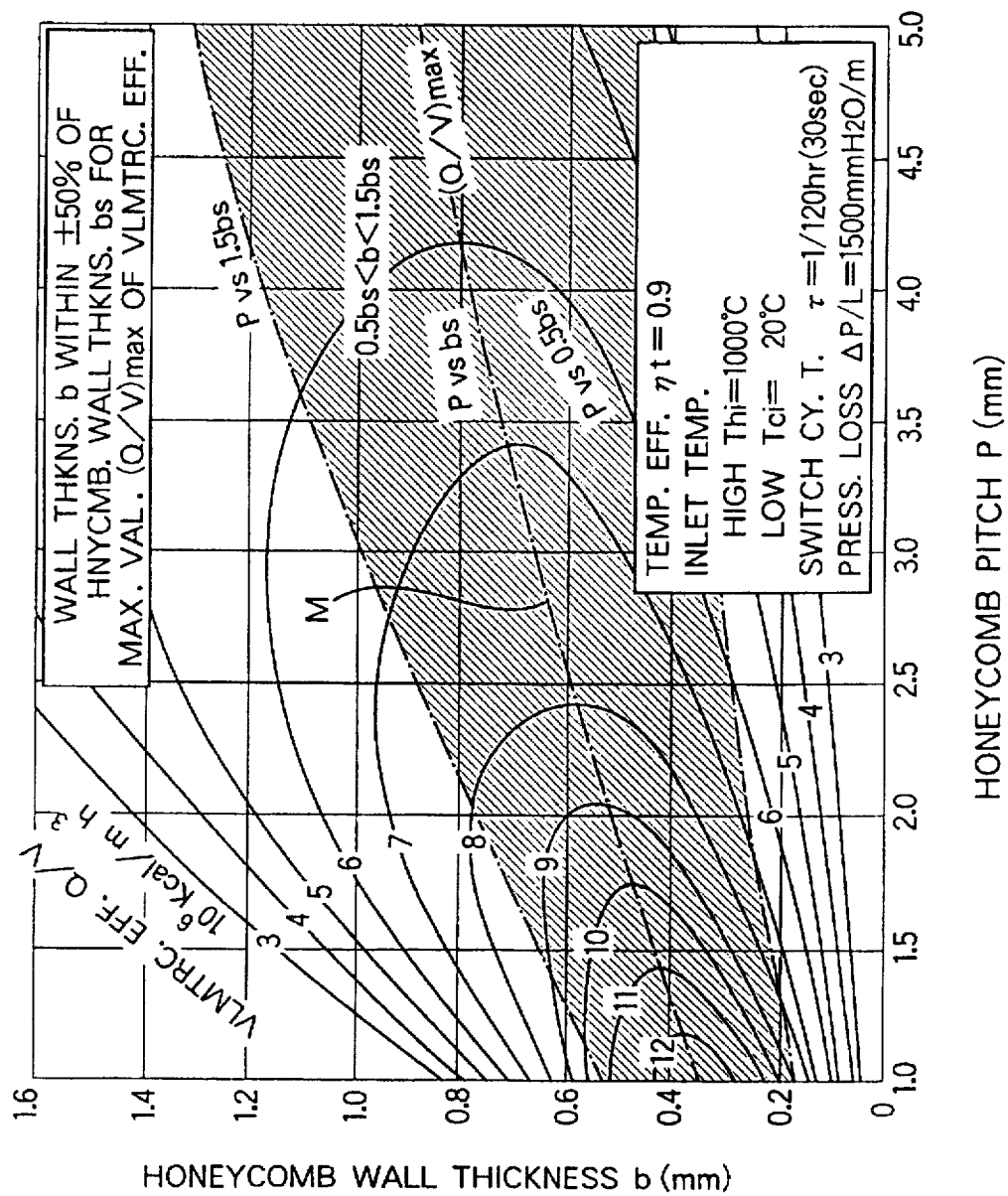
FIG. 18 is a diagram showing the relationship between the honeycomb pitch and the honeycomb wall thickness in the first and second heat exchangers as calculated in accordance with the equations (1) to (4), with the switching cycle time of the four-way valve set to be 30 seconds, wherein the hatched area shows the region of the honeycomb wall thickness and the honeycomb pitch as obtained when the honeycomb wall thickness is varied within the range of ±50%.
Figure 19:
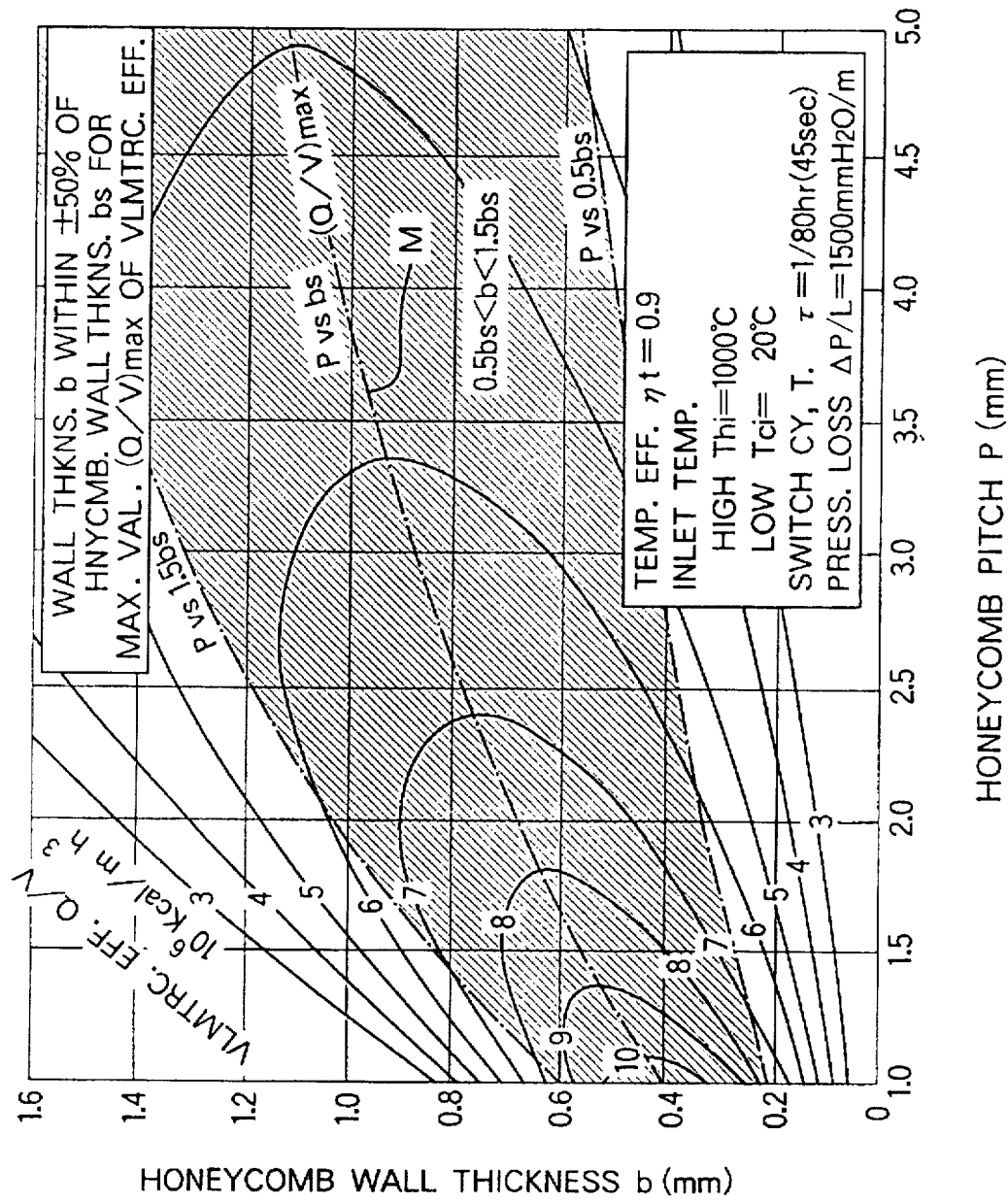
FIG. 19 is a diagram showing the relationship between the honeycomb pitch and the honeycomb wall thickness in the first and second heat exchangers as calculated in accordance with the equations (1) to (4), with the switching cycle time of the four-way valve set to be 45 seconds, wherein the hatched area shows the region of the honeycomb wall thickness and the honeycomb pitch as obtained when the honeycomb wall thickness is varied within the range of ±50%.
Figure 20:
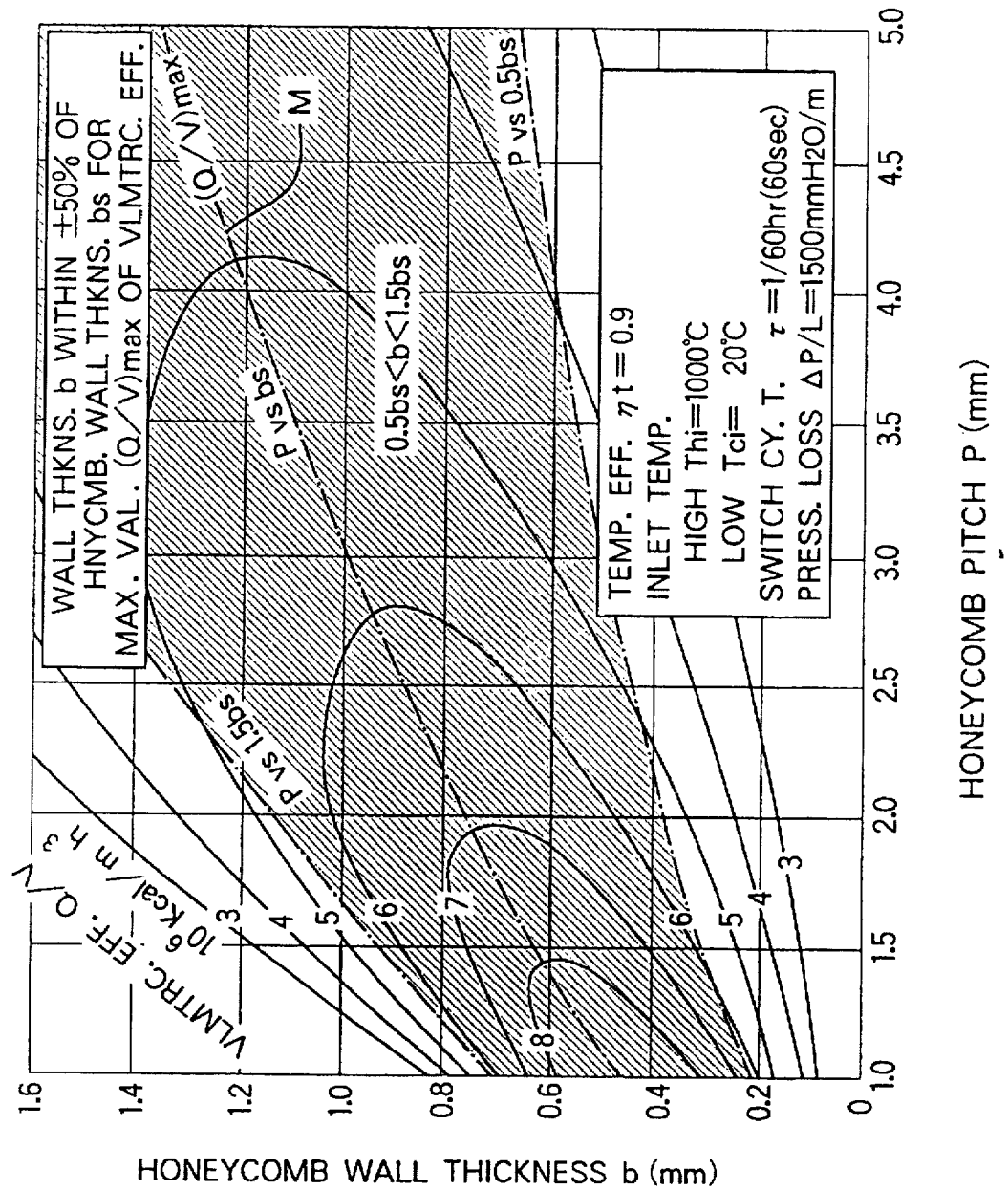
FIG. 20 is a diagram showing the relationship between the honeycomb pitch and the honeycomb wall thickness in the first and second heat exchangers as calculated in accordance with the equations (1) to (4), with the switching cycle time of the four-way valve set to be 60 seconds, wherein the hatched area shows the region of the honeycomb wall thickness and the honeycomb pitch as obtained when the honeycomb wall thickness is varied within the range of ±50%.
Figure 21A:
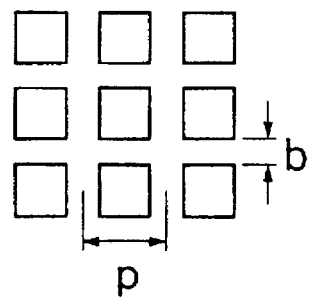
FIGS. 21a–21h, collectively referred to as FIG. 21, are schematic cross-sectional views of a heat exchanger, illustrative of various types of honeycomb structure.
Figure 21B:
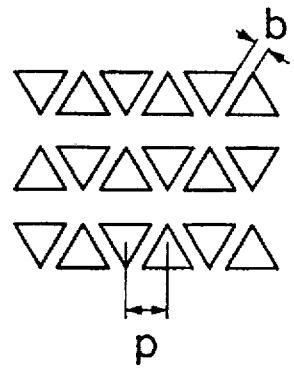
Figure 21C:
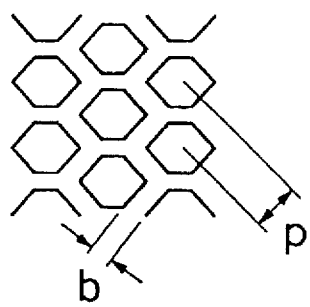
Figure 21D:
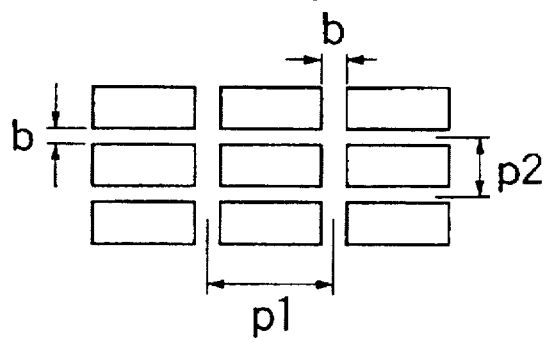
Figure 21E:
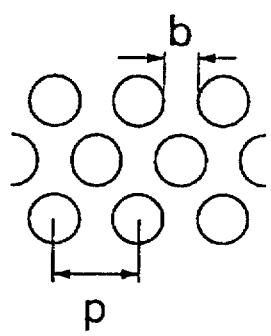
Figure 21F:
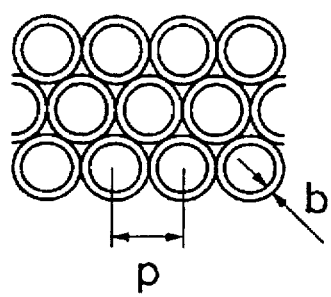
Figure 21G:
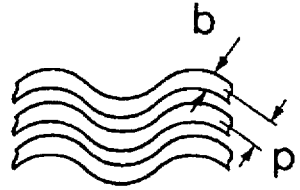
Figure 21H:

FIGS. 13 to 16 are graphic diagrams showing the change or shift of the above-mentioned maximum volumetric efficiency curve M, which occurs when the switching cycle time of the four-way valve 3 is varied within the range of ±50% of the preset time τ in the equations (1) to (4). More specifically, FIG. 13 shows the manner of variation in which the maximum volumetric efficiency curve is shifted by the change of cycle time, based on the maximum volumetric efficiency curve M obtained when the preset switching cycle time τ is 15 seconds. Similarly, FIGS. 14, 15 and 16 show the manners of variation of the maximum volumetric efficiency curves based on the curves M which are obtained when the preset switching cycle time τ is 30 seconds, 45 seconds and 60 seconds, respectively. In the X-Y coordinate system of each of FIGS. 13 to 16, the X-axis represents the values of the honeycomb wall thickness b, and the Y-axis indicates the maximum values (Q/V)max of the volumetric efficiency (Q/V). Each of FIGS. 13 to 16 also shows, by way of example, function curves representing the functional relationships between the maximum value (Q/V)max of the volumetric efficiency and the honeycomb wall thickness b, which functions are obtained by varying the switching cycle time τ when honeycomb pitch values P are preset to 5 mm, 4 mm, 3 mm and 2 mm respectively. The values shown in these Figures have been obtained on an assumption that the temperature efficiency ηt has been set to be 0.9.

In each of FIGS. 13 to 16, the hatched area shows the region over which the maximum volumetric efficiency curve M is shifted when the switching cycle time τ, which is preset to, e.g., 20 seconds in the case of FIG. 13, is varied within the range of ±50% of a predetermined time τ, e.g., the range between 10 seconds and 30 seconds. The X-coordinate values (honeycomb wall thickness values b) falling within this hatched area and relating to a given value of the honeycomb pitch P can suitably be used as the thickness b of the cell wall, which can provide appropriate values of the volumetric efficiency (Q/V) while permitting variation, change or error in the switching cycle time τ.

FIGS. 17 to 20 are graphic diagrams similar to those in FIGS. 9 to 12. Each of these Figures shows the contour lines of the volumetric efficiency (Q/V) and the maximum volumetric efficiency curve M along a ridge of the contour lines. In each of these Figures, the hatched area shows a region of values of the honeycomb wall thickness b and the honeycomb pitch P which are obtained when the Y-coordinate value (i.e., the honeycomb wall thickness b) on the maximum volumetric efficiency curve M is varied within the range of ±50%. The values of the honeycomb pitch P and the honeycomb wall thickness b falling within the hatched area can suitably be used as the values of the pitch P and the thickness b of the cell walls 15 which can provide light-weight and compact construction of each of the heat exchanger units 11, 12.

As can he understood from the foregoing description, the high-cycle regenerative combustion system 1 of the described embodiment of the present invention incorporates the first and second regenerative heat exchanger units 11, 12, which are alternately put into operation by means of the four-way valve 3, and the valve 3 is shifted at a predetermined switching cycle time not longer than 60 seconds. Each of the regenerative heat exchanger units 11, 12 has a void ratio ε, which is determined so as to result in the maximum value (Q/V) max of the volumetric efficiency (O/V) in the prescribed equations (1) to (4).

Further, the temperature efficiency ηt is set to a value ranging between 0.7 and 1.0, e.g. , to 0.9, while the inlet temperature (Tci) of the combustion air (i.e., low temperature fluid) and the inlet temperature (Thi) of the exhaust gas (i.e., the high temperature fluid) are respectively set to be e.g., 20° C. and 1000° C. The temperature efficiency ηt is computed in accordance with the equation (2) as the function of the heat transmission coefficient h, the heat transmission area A and the switching cycle time τ. The values of the heat transmission coefficient h and the heat transmission area A are so determined that the temperature efficiency ηt falls within the above-mentioned predetermined value between 0.7 and 1.0. Thus, each of the heat exchanger units 11, 12 has the values of the pitch P and the thickness b of the cell wall 15 which substantially correspond to the above-mentioned values of the void ratio ε, the heat transmission coefficient h and the heat transmission area A. In the heat exchanger units 11, 12 of such construction, the pitch P and the thickness b of the cell walls 15 substantially correspond to the maximum value (Q/V)max of the volumetric efficiency (Q/V), so as to provide the desired high heat transmission rate while minimizing the overall volume of the heat exchanger unit. Further, such values of the pitch P and the thickness b of the cell walls 15 achieve the value of the temperature efficiency ηt falling within the range of between 0.7 and 1.0, thus meeting the requirement for high temperature efficiency essential in a high-cycle regenerative combustion system.

Still further, in the embodiment as described above, the pitch P and the thickness b of the cell walls 15 are preferably determined so as to provide a volumetric efficiency (Q/V) which is not less than 75% of the maximum value (Q/V)max calculated under specific or predetermined conditions. By using such values of the pitch P and thickness b of the cell walls 15, it is possible to design a light-weight and compact heat exchanger unit 11, 12 while maintaining the volumetric efficiency (Q/V) at a desired level. More preferably, the upper limit of the thickness b of the cell walls 15 is set to be a value which can provide a volumetric efficiency (Q/V) not less than 90% of the maximum value (Q/V)max. By keeping such an upper limit of the cell wall thickness b, it is possible to further reduce the weight of the first and second heat exchanger units 11, 12.

From another aspect of the embodiment described hereinbefore, the pitch P and the thickness b of the cell walls 15 of the first and second heat exchanger units 11, 12 are preferably determined so as to correspond to the maximum value (Q/V)max of the volumetric efficiency (Q/V) obtainable when the switching cycle time τ of the four-way valve 3 is varied in the equations (1) to (4) within the range of ±50% of the preset value. Using such values of the pitch P and the thickness b of the cell walls 15, a variation, change or error in the switching cycle time τ is permitted to some extent while ensuring the suitable volumetric efficiency (Q/V).

From still another aspect of the above embodiment, each of the first and second heat exchanger units 11, 12 can have a thickness b of the cell walls 15 so that it falls within the range of ±50% of the cell wall thickness b which can provide the maximum value (Q/V)max of the volumetric efficiency calculated under specific conditions. With such a value of the cell wall thickness b, a light-weight and compact heat exchanger unit 11, 12 can be designed while a suitable value of the volumetric efficiency (Q/V) is ensured.

The term "honeycomb structure" is used to generally means structures in which a plurality of passages or channels are arranged in a honeycomb-like form. The constructions or arrangements of the heat accumulators used in the first and second heat exchanger units 11, 12 are therefore not limited to the above described honeycomb structure, but various other honeycomb structures can be equally applied. FIG. 21 shows alternative forms of the honeycomb structure usable in the present invention. It can be readily understood from FIG. 21 that the flow channel in the honeycomb structure may have a circular, triangular, square, rectangular or hexagonal cross-section, or the like. The honeycomb structure also my be built up by assembling tubes of circular cross-section, plates, and so forth. In FIG. 21, the honeycomb pitch P and the honeycomb wall thickness b in each form of the honeycomb structure are indicated. It would be clear to those skilled in the art that the equations for determining the void ratio e and the ratio A/Gm is appropriately modified or changed in accordance with the variation in the form of the honeycomb structure.

Figure 22:
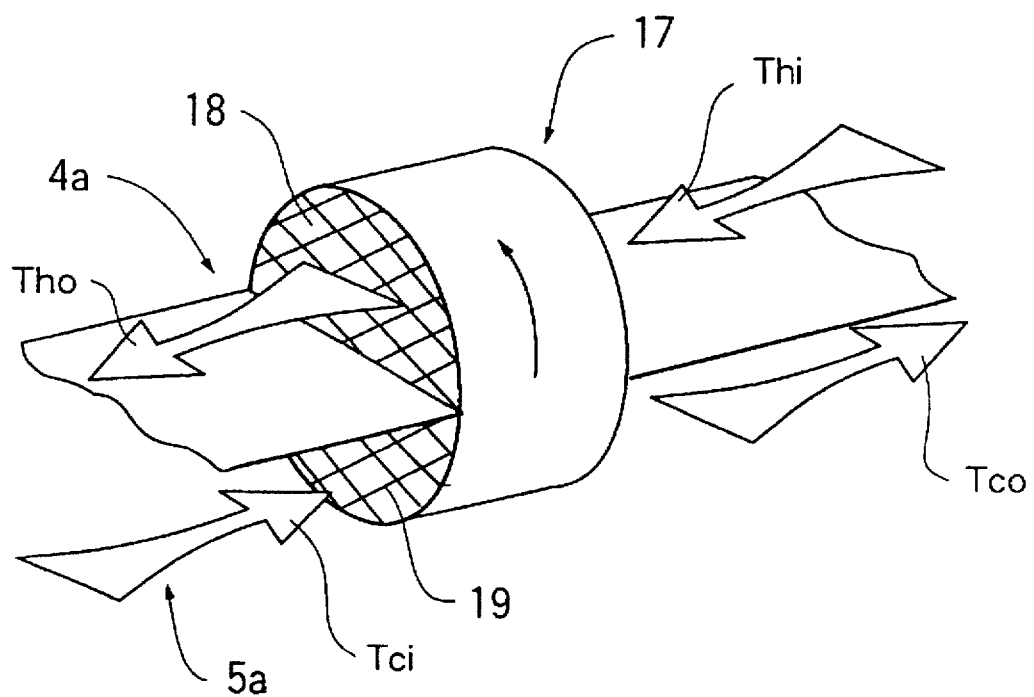
FIG. 22 is a perspective view of a regenerative heat exchanger of a rotary type.

The combustion system of the above described embodiment is so constructed that the flow passages 4, 5, as well as the burners 21, 22, are alternately switched while the first and second heat exchanger units 11, 12 are stationary at the predetermined positions. It is to be understood, however, that the present invention can equally be applied to a rotary type of regenerative heat exchanger unit in which a heat exchanger itself is rotated whereas operation of the flow passages and the burners are substantially constant. FIG. 22 illustrates an example of a rotary type of regenerative heat exchanger. Referring to FIG. 22, a rotary heat exchanger 17 has a lattice-like honeycomb structure having a plurality of flow passages or channels 18 defined by cell walls 19. The heat exchanger 17 is rotationally driven in the direction of the arrow by a driving device (not shown) in such a manner that a portion, which is located in a passage 5a for a low temperature fluid (e.g., combustion air) and a portion positioned in a passage 4a of a high temperature fluid (e.g., the exhaust gas) are alternately and periodically replaced with each other. The rotary heat exchanger 17 of this type can perform substantially the same function as the combination of the heat exchanger units 11, 12 in the preceding embodiment, and the pitch and the thickness of the cell walls 19 of the heat exchanger 17 can be determined substantially in the same manner as the determination or calculation of the pitch P and the thickness b of the cell walls 15 in the above heat exchanger units 11, 12.

Although the described embodiment employs the four-way valve 3 as the means for switching the fluid flow passages, other type of switching means, such as case-switching type high-speed switching system having a so-called Cross Exchange Mechanism (CEM), which is disclosed in the specification of Japanese Patent Application No. 4-216743 of the present applicant (this application has not yet been published), may be used as the means for switching the fluid passages.

As can be understood from what has been described above, the present invention provides a regenerative heat exchanger for use in a high-cycle regenerative combustion system, wherein the heat transmission rate and the overall volume of the heat exchanger can efficiently be selected while high level of temperature efficiency is ensured. It is therefore possible to reduce the overall size of the heat exchanger while maintaining the heat transmission rate and the temperature efficiency at desired high levels. Thus, the present invention provides a regenerative heat exchanger which has a compact construction and which exhibits improved performance.

While the present invention has thus been shown and described in connection with the particular preferred embodiments, it is apparent that certain changes and modifications, in addition to these mentioned above, may be made by those skilled in the art without departing from the basic features of the present invention. Accordingly, it should be noted that the present invention is in no way limited to the details of the described arrangements.

What is claimed is:

1. A high-cycle regenerative combustion system having a switching time set to be no greater than 60 seconds, said combustion system comprising a furnace having a combustion zone and a regenerative heat exchanger associated with said combustion zone, said heat exchanger alternately contacting a low temperature fluid which is combustion air, fuel gas or a mixture of the combustion air and the fuel gas, and a high temperature fluid which is exhaust gas, flue gas or burnt gas generated as a result of combustion in said furnace, so as to perform heat exchange between said low temperature fluid and said high temperature fluid, said regenerative heat exchanger comprising:

a heat accumulator having a honey-comb structure with a plurality of flow passages, wherein said honey-comb structure has a honey-comb wall thickness of less than or equal to 1.6 mm and a honey-comb pitch of less than or equal to 5.0 mm, wherein a volumetric efficiency of said heat accumulator, defined as a heat transmission rate of said heat accumulator per a whole volume of the heat accumulator, is set to be a function of a temperature efficiency, a fluid temperature and a void ratio, said temperature efficiency and said fluid temperature being preset to be predetermined values, said temperature efficiency being selected to be a value within the range of from 0.7 to less than 1.0 and set to be a function of a heat transmission coefficient of said heat accumulator, a heat transmission area thereof and the switching cycle time, the heat transmission coefficient, heat transmission area, and void ratio all being defined as functions of the honey-comb pitch and honey-comb wall thickness; and wherein the sizes of the honey-comb wall thickness and honey-comb pitch are selected to result in the void ratio at which said volumetric efficiency substantially exhibits a maximum value and also are selected to result in the heat transmission coefficient and the heat transmission area which correspond to the predetermined value of said temperature efficiency.

2. A regenerative heat exchanger according to claim 1, wherein the volumetric efficiency (Q/V) is defined by the following equation (1), and said temperature efficiency ($\eta t$) is defined by the following equation (2):

$$Q/V = \eta t (Thi-Tci)(1-\epsilon) Cm/\tau \cdot PM2/PM1 \qquad (1)$$

$$\eta t = 1/(1+2/PM1+\exp(-2PM1/PM2)) \qquad (2)$$

wherein PM1 and PM2 in the equations (1) and (2) are defined as follows:

$$PM1 = hA/Cg\ Gg$$

$$PM2 = hA\tau/Cm\ Gm$$

where the respective symbols represent the following factors:

| | |
|---|---|
| Tci: inlet temperature of the low temperature fluid | °C. |
| Thi: inlet temperature of the high temperature fluid | °C. |
| $\epsilon$: void ratio of the heat accumulator | |
| A: heat transmission area | m² |
| h: heat transmission coefficient | Kcal/m² °C. |
| $\tau$: switching cycle time | hr |
| Cg: constant-pressure specific heat of gas | Kcal/m³ N °C. |
| Gg: flow rate of the fluid | m³ N/h |
| Cm: specific heat of the heat accumulator | Kcal/m³ °C. |
| Gm: net volume of the heat accumulator | m³ | and wherein said heat accumulator has the void ratio ($\epsilon$) at which said volumetric efficiency (Q/V) exhibits its maximum value and also has the heat transmission coefficient (h) and the heat transmission area (A) with which said temperature efficiency ($\eta t$) exhibits said preset value, and said honey-comb pitch and said honey-comb wall thickness being selected to be values which correspond to said void ratio ($\epsilon$), heat transmission coefficient (h) and heat transmission area (A).

3. A regenerative heat exchanger according to claim 2, wherein said heat transmission coefficient (h) is calculated in accordance with the following equation (3):

$$h = 3.5 T^{0.23} V_n^{0.8}/d^{0.2} \qquad (3)$$

where the respective symbols represent the following factors:

d: equivalent diameter(m)
  equivalent diameter =
  4 × (cross-sectional area of flow channel)/
  (circumferential length of cross-section of flow channel)

T: mean temperature of fluid (K)
  T = 273+(Thi+Tci)/2

Vn: fluid flow velocity (mN/s) converted to values under standard state (0° C. 1 atm).

4. A regenerative heat exchanger according to claim 3, wherein a pressure loss (ΔP/L) across the flow passage per unit length of the flow passage is set to be a value within the range of between 1000 and 2000 mm $H_2O$/m and the flow velocity (Vn) of the fluid is calculated in accordance with the following equation (4):

$$Vn = \sqrt{(d/1.3 \cdot 2g/\gamma n \cdot 273/T \cdot \Delta P/L)} \quad (4)$$

where the respective symbols represent the following factors:

| | |
|---|---|
| g: gravitational acceleration | 9.8 m/s² |
| L: length of fluid flow passage | m |
| γn: specific gravity of the fluid in standard state (0° C., 1 atm) | Kg/m³ N |
| ΔP: pressure loss | mmH₂O. |

5. A regenerative heat exchanger according to claim 4, wherein said pressure loss (ΔP/L) is set to be approximately 1500 mm $H_2O$/m.

6. A regenerative heat exchanger according to claim 2, wherein said heat accumulator is made of ceramics and wherein the specific heat (Cm) of said heat accumulator is set to be approximately 406.

7. A regenerative heat exchanger according to claim 2, wherein said heat accumulator is made of steel and the specific heat (Cm) of said heat accumulator is set to he approximately 860.

8. A regenerative heat exchanger according to claim 1, wherein said heat accumulator has a lattice-like honey-comb structure having a plurality of flow channels each having a square or rectangular cross-section.

9. A regenerative heat exchanger according to claim 1, wherein said switching cycle time (τ) is preset to he a value not longer than 60 sec, and said heat accumulator has the void ratio (ε) of a value which corresponds to the volumetric efficiency (Q/V) of a value not less than 75% of said maximum value (Q/V)max.

10. A regenerative heat exchanger according to claim 9, where in said honey-comb wall thickness has an upper limit corresponding to the void ratio value (ε) which provides the volumetric efficiency (Q/V) not less than 90% of said maximum value (Q/V)max.

11. A regenerative heat exchanger according to claim 1, wherein said switching cycle time (τ) is preset to he a value not longer than 60 sec, and said heat accumulator has the void ratio (ε) of a value which corresponds to said maximum value (Q/V)max of volumetric efficiency selected within the range of ±50% of the preset value of said switching cycle time (τ).

12. A regenerative heat exchanger according to claim 1, wherein said switching cycle time (τ) is preset to he a value not longer than 60 sec, and said heat accumulator has a honey-comb wall thickness which is selected within the range of ±50% of the honeycomb wall thickness(b) which corresponds to said void ratio (ε).

13. A high-cycle heat regenerative combustion system according to claim 1, wherein said heat exchanger includes first and second stationary regenerative heat exchanger units and the flow paths for the low temperature fluid and the high temperature fluid are alternately switchable such that, when said low temperature fluid is caused to flow through said first heat exchanger unit, said high temperature fluid is adapted to flow through said second heat exchanger unit, whereas, when said low temperature fluid is caused to flow through said second heat exchanger unit, said high temperature fluid is adapted to flow through said first heat exchanger unit, the switching of said fluid paths being conducted at a time interval not longer than 60 seconds.

14. A regenerative heat exchanger according to claim 1, wherein said heat exchanger is a rotary regenerative heat exchanger having a first portion and a second portion which are switchingly and alternately placed in a first flow passage for said low temperature fluid and a second flow passage for said high temperature fluid such that, when said first portion of said heat exchanger is positioned in the first passage, said high temperature fluid is adapted to flow through said second portion of the heat exchanger, whereas, when said second portion of the heat exchanger is positioned in the first passage, said high temperature fluid is adapted to flow through said first portion of the heat exchanger, and wherein the said first portion and said second portion are switched at a time interval not longer than 60 seconds.

15. A regenerative heat exchanger according to claim 2, wherein said heat accumulator has a lattice-like honey-comb structure having a plurality of flow channels each having a square or rectangular cross-section.

16. A regenerative heat exchanger according to claim 2, wherein said switching cycle time (τ) is preset to be a value not longer than 60 sec, and said heat accumulator has the void ratio (ε) of a value which corresponds to the volumetric efficiency (Q/V) of a value not less than 75% of said maximum value (Q/V)max.

17. A regenerative heat exchanger according to claim 16, wherein said honey-comb wall thickness has an upper limit corresponding to the void ratio value (ε) which provides the volumetric efficiency (Q/V) not less than 90% of said maximum value (Q/V)max.

18. A regenerative heat exchanger according to claim 2, wherein said switching cycle time (τ) is preset to be a value not longer than 60 sec, and said heat accumulator has the void ratio (ε) of a value which corresponds to said maximum value (Q/V)max of volumetric efficiency selected within the range of ±50% of the preset value of said switching cycle time (τ).

19. A regenerative heat exchanger according to claim 2, wherein said switching cycle time (τ) is preset to be a value not longer than 60 sec, and said heat accumulator has a honey-comb wall thickness which is selected within the range of ±50% of the honeycomb wall thickness(b) which corresponds to said void ratio (ε).

20. A high-cycle heat regenerative combustion system according to claim 2, wherein said furnace includes first and second combustion zones, and wherein said heat exchanger includes first and second stationary regenerative heat exchanger units respectively associated with said first and second combustion zones and the flow paths for the low temperature fluid and the high temperature fluid are alternately switchable such that, when said low temperature fluid is caused to flow through said first heat exchanger unit, said high temperature fluid is adapted to flow through said second heat exchanger unit, whereas, when said low temperature fluid is caused to flow through said second heat exchanger unit, said high temperature fluid is adapted to flow through said first heat exchanger unit, the switching of said fluid paths being conducted at a time interval not longer than 60 seconds.

21. A regenerative heat exchanger according to one of claims 2, wherein said heat exchanger is a rotary regenerative heat exchanger having a first portion and a second portion which are switchingly and alternately placed in a first flow passage for said low temperature fluid and a second flow passage for said high temperature fluid such that, when said first portion of said heat exchanger is positioned in the first passage, said high temperature fluid is adapted to flow through said second portion of the heat exchanger, whereas, when said second portion of the heat exchanger is positioned in the first passage, said high temperature fluid is adapted to flow through said first portion of the heat exchanger, and wherein the said first portion and said second portion are switched at a time interval not longer than 60 seconds.

22. A high-cycle heat regenerative combustion system comprising:

a furnace having a combustion zone;

a regenerative heat exchanger associated with said combustion zone, said heat exchanger having a switching cycle time set to be no greater than 60 seconds, so that said heat exchanger alternately contacts a low temperature fluid which is combustion air, fuel gas or a mixture of the combustion air and the fuel gas, and a high temperature fluid which is exhaust gas, flue gas or burnt gas generated as a result of combustion in said combustion system, thereby performing heat exchange between said low temperature fluid and said high temperature fluid, the low temperature fluid and the high temperature fluid each having a flow path; and a four-way valve for switching the flow path for the low temperature fluid and the flow path for the high temperature fluid;

wherein said regenerative heat exchanger comprises:

a heat accumulator having a honey-comb structure, wherein said honey-comb structure has a honey-comb wall thickness of less than or equal to 1.6 mm and a honey-comb pitch of less than or equal wherein a volumetric efficiency of said heat accumulator, defined as a heat transmission rate of said heat accumulator per a whole volume of the heat accumulator, is set to be a function of a temperature efficiency, a fluid temperature and a void ratio, said temperature efficiency and said fluid temperature being preset to be predetermined values, said temperature efficiency being selected to be a value within the range of from 0.7 to less than 1.0 and set to be a function of a heat transmission coefficient of said heat accumulator, a heat transmission area thereof and the switching cycle time, the heat transmission coefficient, heat transmission area, and void ratio all being defined as functions of the honey-comb pitch and honey-comb wall thickness; and wherein the sizes of the honey-comb wall thickness and honey-comb pitch are selected to result in the void ratio at which said volumetric efficiency substantially exhibits a maximum value and also are selected to result in the heat transmission coefficient and the heat transmission area which correspond to the predetermined value of said temperature efficiency.

23. A high-cycle heat regenerative combustion system according to claim 22, wherein said heat exchanger includes first and second stationary regenerative heat exchanger units and the flow paths for the low temperature fluid and the high temperature fluid are alternately switchable such that, when said low temperature fluid is caused to flow through said first heat exchanger unit, said high temperature fluid is adapted to flow through said second heat exchanger unit, whereas, when said low temperature fluid is caused to flow through said second heat exchanger unit, said high temperature fluid is adapted to flow through said first heat exchanger unit, the switching of said fluid paths being conducted at a time interval not longer than 60 seconds.

24. A high-cycle heat regenerative combustion system comprising:

a furnace having a combustion zone;

a regenerative heat exchanger associated with said combustion zone, said heat exchanger having a switching cycle time set to be no greater than 60 seconds at the longest, so that said heat exchanger alternately contacts a low temperature fluid which is combustion air, fuel gas or a mixture of the combustion air and the fuel gas, a high temperature fluid which is exhaust gas, flue gas or burnt gas generated as a result of combustion in said combustion system, thereby performing heat exchange between said low temperature fluid and said high temperature fluid, the low temperature fluid and the high temperature fluid each having a flow path; and a high-speed switching system having a cross exchange mechanism for performing switching the flow path for the low temperature fluid and the flow path for the high temperature fluid;

wherein said regenerative heat exchanger comprises:

a heat accumulator having a honey-comb structure, wherein said honey-comb structure has a honey-comb wall thickness of less than or equal to 1.6 mm and a honey-comb pitch of less than or equal to 5.0 mm, wherein a volumetric efficiency of said heat accumulator, defined as a heat transmission rate of said heat accumulator per a whole volume of the heat accumulator, is set to be a function of a temperature efficiency, a fluid temperature and a void ratio, said temperature efficiency and said fluid temperature being preset to be predetermined values, said temperature efficiency being selected to be a value within the range of from 0.7 to less than 1.0 and set to be a function of a heat transmission coefficient of said heat accumulator, a heat transmission area thereof and the switching cycle time, the heat transmission coefficient, heat transmission area, and void ratio all being defined as functions of the honey-comb pitch and honey-comb wall thickness; and wherein the sizes of the honey-comb wall thickness and honey-comb pitch are selected to result in the void ratio at which said volumetric efficiency substantially exhibits a maximum value and also are selected to result in the heat transmission coefficient and the heat transmission area which correspond to the predetermined value of said temperature efficiency.

25. A high-cycle heat regenerative combustion system according to claim 22, wherein said heat exchanger is a rotary regenerative heat exchanger having a first portion and a second portion which are switchingly and alternately placed in a first flow passage for said low temperature fluid and a second flow passage for said high temperature fluid such that, when said first portion of said heat exchanger is positioned in the first passage, said high temperature fluid is adapted to flow through said second portion of the heat exchanger, whereas, when said second portion of the heat exchanger is positioned in the first passage, said high temperature fluid is adapted to flow through said first portion of the heat exchanger, and wherein the said first portion and said second portion are switched at a time interval not longer than 60 seconds.

26. A high-cycle heat regenerative combustion system according to claim 22, wherein the volumetric efficiency (Q/V) is defined by the following equation (1), and said temperature efficiency ($\eta t$) is defined by the following equation (2):

$$Q/V = \eta t (Thi - Tci)(1-\epsilon) \, Cm/t \cdot PM2/PM1 \tag{1}$$

$$\eta t = 1/(1 + 2/PM1 + \exp(-2PM1/PM2)) \tag{2}$$

wherein PM1 and P2 in the equations (1)and (2) are defined as follows:

$$PM1 = hA/Cg\ Gg$$

$$PM2 = hA\tau/Cm\ Gm$$

where the respective symbols represent the following factors:

| | |
|---|---|
| Tci: inlet temperature of the low temperature fluid | °C. |
| Thi: inlet temperature of the high temperature fluid | °C. |
| ε: void ratio of the heat accumulator | |
| A: heat transmission area | m² |
| h: heat transmission coefficient | Kcal/m² °C. |
| τ: switching cycle time | hr |
| Cg: constant-pressure specific heat of gas | Kcal/m³ N °C. |
| Gg: flow rate of the fluid | m³ N/h |
| Cm: specific heat of the heat accumulator | Kcal/m³ °C. |
| Gm: net volume of the heat accumulator | m³ | and wherein said heat accumulator has the void ratio (ε) at which said volumetric efficiency (Q/V) exhibits its maximum value and also has the heat transmission coefficient (h) and the heat transmission area (A) with which said temperature efficiency (ηt) exhibits said preset value, and said honey-comb pitch and said honey-comb wall thickness being selected to be values which correspond to said void ratio (ε), heat transmission coefficient (h) and heat transmission area (A).

27. A high-cycle heat regenerative combustion system according to claim 26, wherein said furnace includes first and second combustion zones, and wherein said heat exchanger includes first and second stationary regenerative heat exchanger units respectively associated with said first and second combustion zones and the flow paths for the low temperature fluid and the high temperature fluid are alternately switchable such that, when said low temperature fluid is caused to flow through said first heat exchanger unit, said high temperature fluid is adapted to flow through said second heat exchanger unit, whereas, when said low temperature fluid is caused to flow through said second heat exchanger unit, said high temperature fluid is adapted to flow through said first heat exchanger unit, the switching of said fluid paths being conducted at a time interval not longer than 60 seconds.

28. A high-cycle heat regenerative combustion system according to claim 26, wherein the volumetric efficiency (Q/V) is defined by the following equation (1), and said temperature efficiency (ηt) is defined by the following equation (2):

$$Q/V = \eta t(Thi-Tci)(1-\epsilon)\ Cm/\tau \cdot PM2/PM1 \quad (1)$$

$$\eta t = 1/(1+2/PM1+\exp(-2PM1/PM2)) \quad (2)$$

wherein PM1 and PM2 in the equations (1) and (2) are defined as follows:

$$PM1 = hA/Cg\ Cg$$

$$PM2 = jA\tau/Cm\ Gm$$

where the respective symbols represent the following factors:

| | |
|---|---|
| Tci: inlet temperature of the low temperature fluid | °C. |
| Thi: inlet temperature of the high temperature fluid | °C. |
| ε: void ratio of the heat accumulator | |
| A: heat transmission area | m² |
| h: heat transmission coefficient | Kcal/m² °C. |
| τ: switching cycle time | hr |
| Cg: constant-pressure specific heat of gas | Kcal/m³ N °C. |
| Gg: flow rate of the fluid | m³ N/h |
| Cm: specific heat of the heat accumulator | Kcal/m³ °C. |
| Gm: net volume of the heat accumulator | m³ | and wherein said heat accumulator has the void ratio (ε) at which said volumetric efficiency (Q/V) exhibits its maximum value and also has the heat transmission coefficient (h) and the heat transmission area (A) with which said temperature efficiency (ηt) exhibits said preset value, and said honey-comb pitch and said honey-comb wall thickness being selected to be values which correspond to said void ration (ε), heat transmission coefficient (h) and heat transmission area (A).

29. A high-cycle heat regenerative combustion system according to claim 26, wherein said heat exchanger is a rotary regenerative heat exchanger having a first portion and a second portion which are switchingly and alternately placed in a first flow passage for said low temperature fluid and a second flow passage for said high temperature fluid such that, when said first portion of said heat exchanger is positioned in the first passage, said high temperature fluid is adapted to flow through said second portion of the heat exchanger, whereas, when said second portion of the heat exchanger is positioned in the first passage, said high temperature fluid is adapted to flow through said first portion of the heat exchanger, and wherein the said first portion and said second portion are switched at a time interval not longer than 60 seconds.

* * * * *